United States Patent [19]
Elko et al.

[11] Patent Number: 5,742,830
[45] Date of Patent: Apr. 21, 1998

[54] METHOD AND APPARATUS FOR PERFORMING CONDITIONAL OPERATIONS ON EXTERNALLY SHARED DATA

[75] Inventors: David Arlen Elko, Poughkeepsie; Jeffrey Alan Frey, Fishkill; Audrey Ann Helffrich; John Franklin Isenberg, Jr., both of Poughkeepsie; Jeffrey Mark Nick, Fishkill, all of N.Y.; Jimmy Paul Strickland, Saratoga, Calif.; Michael Dustin Swanson; Brian Barry Moore, both of Poughkeepsie, N.Y.

[73] Assignee: International Business Machines Corporation, Armonk, N.Y.

[21] Appl. No.: 383,532

[22] Filed: Feb. 1, 1995

Related U.S. Application Data

[63] Continuation of Ser. No. 860,655, Mar. 30, 1992, abandoned.

[51] Int. Cl.⁶ ..................................... G06F 13/16
[52] U.S. Cl. ............... 395/728; 395/474; 395/601; 395/616; 395/674; 395/676; 395/729
[58] Field of Search ................... 395/650, 700, 395/601, 609, 616, 674, 676, 682, 683, 728, 729, 474

[56] References Cited

U.S. PATENT DOCUMENTS

| | | | |
|---|---|---|---|
| 4,183,083 | 1/1980 | Chatfield | 364/200 |
| 4,189,771 | 2/1980 | Roever | 364/300 |
| 4,399,504 | 8/1983 | Obermarck et al. | 364/200 |
| 4,410,940 | 10/1983 | Carlson et al. | 364/200 |
| 4,435,766 | 3/1984 | Haber et al. | 364/200 |
| 4,847,754 | 7/1989 | Obermark et al. | 364/200 |
| 5,175,851 | 12/1992 | Johnson et al. | 364/DIG. 1 |
| 5,202,971 | 4/1993 | Henson et al. | 364/DIG. 1 |
| 5,222,238 | 6/1993 | Zobre et al. | 364/DIG. 1 |

OTHER PUBLICATIONS

IBM Tech. Disclosure Bulletin, vol. 34, No. 6, Dec. 1991—pp. 80–88 "Concurrent Algorithm for Managing a First–In, First Out Queue with Two–Way Painters".

IEEE—Dec. 1990 "A Simple & Correct Shared–Queue Algorithm Using Compare–and–Swap" by Janice M. Stone, pp. 495–504.

*Primary Examiner*—Kevin A. Kriess
*Assistant Examiner*—Michael T. Richey
*Attorney, Agent, or Firm*—W. A. Kinnaman, Jr.

[57] ABSTRACT

A Structured External Storage (SES) processor is linked by a communication means to one or more general purpose processors. Two or more applications executing on the one or more general purpose processors communicate function request messages to a message processor within the SES to effect serialized sharing of data within the SES. Within the message processor, a predicate function means executes unconditionally on receipt of one of the function request messages, and a data function means executes conditionally and atomically with respect to the predicate function means following a "successful" condition produced by the predicate function means. The predicate function means comprises a predicate compare function means and a predicate update means, the predicate compare function means executing unconditionally and producing a "successful" or "unsuccessful" result, the predicate means executing conditionally and atomically with respect to the predicate compare function means, following a "successful" result by the predicate update compare function means.

24 Claims, 17 Drawing Sheets

FIG. 4B

REQUEST OPERANDS                                402

| LEID-404 | LEK-428  | ETELR-461 | TDIR-478  |
| LEN-405  | ELT-429  | LELX-462  | MELT-479  |
| DIR-406  | LC-433   | SID-465   | DBS-4A3   |
| VN-411   | ALE-434  | SS-466    | RT-4A4    |
| LRT-412  | LET-435  | USC-467   | SDI-4A8   |
| LLB-413  | DLES-436 | LCT-468   | EDI-4A9   |
| LTEN-414 | MDLES-437| LECL-469  | LELCL-4AA |
| CGLM-415 | KRT-439  | ULC-472   | RLT-4AB   |
| LLM-416  | DELT-440 | UAC-475   | RX-4AC    |
| UID-418  | LNT-441  |           | RVN-4AD   |
| WRT-420  | LNEN-442 |           |           |
| CVN-421  | NESC-443 |           |           |
| VRT-422  | SU-444   |           |           |
| LN-423   | LNRT-445 |           |           |
| LTEX-425 | LST-447  |           |           |
| LTEC-427 | TLEK-452 |           |           |
|          | TLN-453  |           |           |

FIG. 4C

RESPONSE OPERANDS  403

| | | |
|---|---|---|
| RC-407 | MLSEC-480 | RVN-4A0 |
| VN-408 | MLSELC-481 | ALE-4A1 |
| LEID-410 | SS-482 | RLEC-4A2 |
| UID-419 | LST-483 | RT-4A5 |
| LN-430 | LTEX-484 | DLEC-4A7 |
| LTEN-431 | LELX-485 | CDI-4B0 |
| LEC-446 | ETELR-486 | LELC-4B2 |
| LEN-448 | LTEC-487 | LSTC-4B1 |
| LEK-449 | LC-488 | MDLES-4B3 |
| DLES-451 | LSELC-490 | LELCL-4B4 |
| LTE-455 | NLTEC-491 | |
| SI-456 | LSEC-492 | |
| LECL-459 | USC-494 | |
| | UIDV-495 | |
| | ULC-497 | |
| | UAC-499 | |

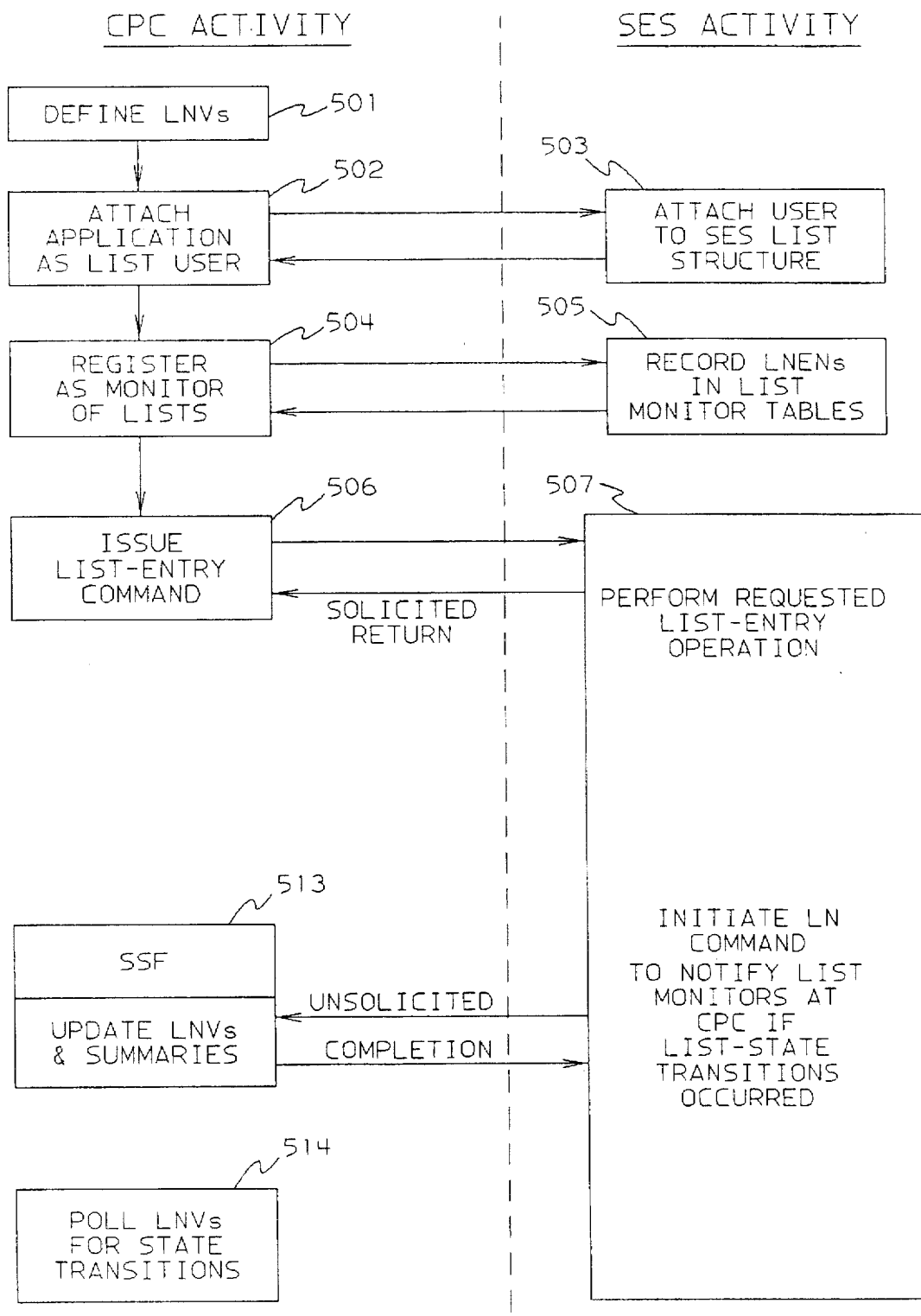

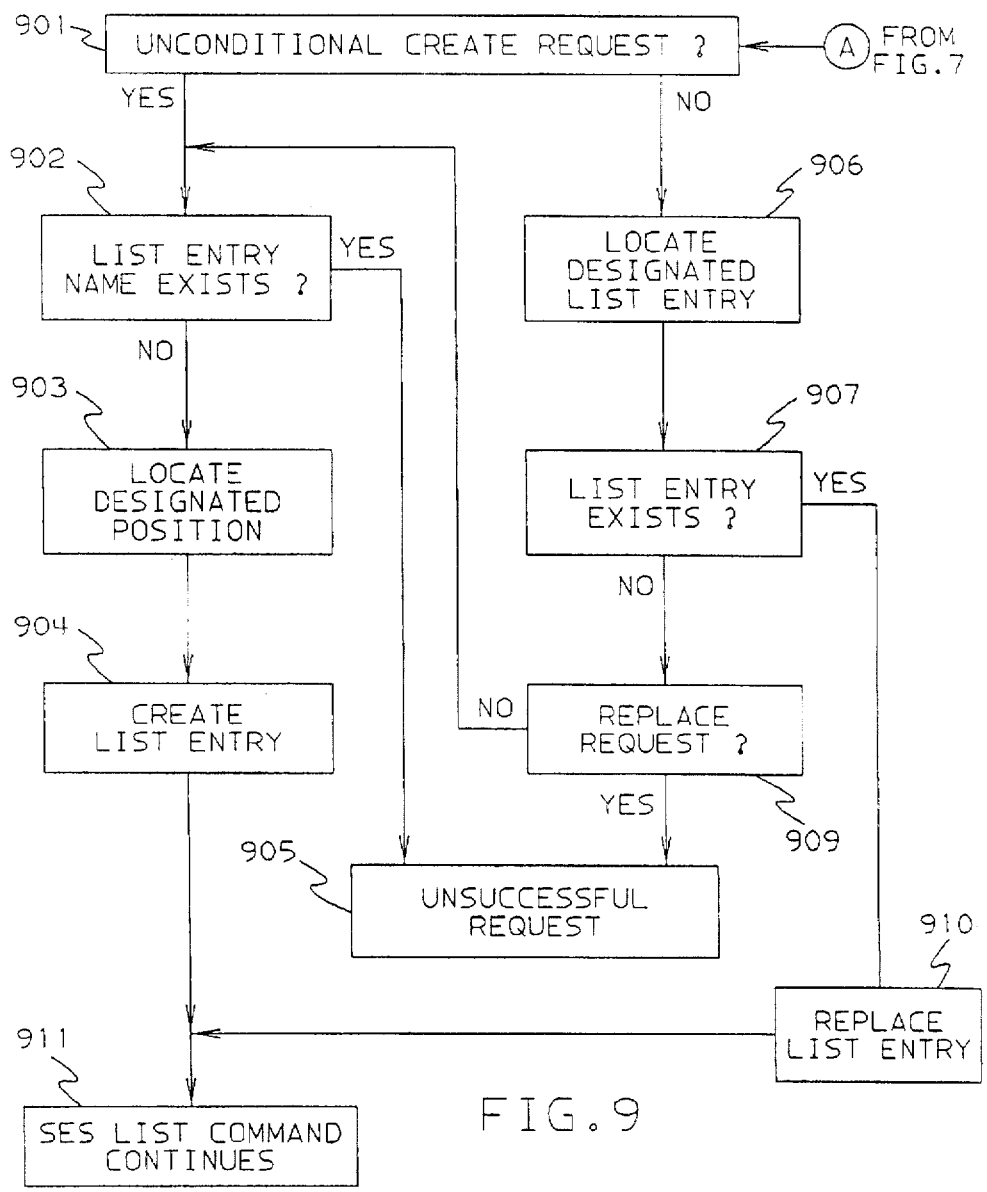

METHOD AND APPARATUS FOR PERFORMING CONDITIONAL OPERATIONS ON EXTERNALLY SHARED DATA

This is a continutation of application Ser. No. 07/860,655, filed on Mar. 30, 1992, now abandoned.

CROSS REFERENCE TO RELATED APPLICATIONS

This application contains subject matter which is related to the subject matter of the following applications which are assigned to the same assignee as this application. They are hereby incorporated by reference:

"Configurable, Recoverable Parallel Bus" by N. G. Bartow et al, Ser. No. 07/839,657, (Docket No. PO991066), Filed: Feb. 20, 1992; "High Performance Intersystem Communications For Data Processing Systems" by N. G. Bartow et al, Ser. No. 07/839,652, (Docket No. PO991067), Filed: Feb. 20, 1992; and "Frame-Group Transmission And Reception For Parallel/Serial Buses", issued as U.S. Pat. No. 5,267,240 on Nov. 30, 1993.

The subject matter in the following listed applications is also related to and is hereby incorporated by reference in the present application. Each of the following listed applications is owned by the same assignee as the present application, is filed on the same day as the present application, and has the same priority date as the present application. They are:

"Communicating Messages Between Processors And A Coupling Facility" by D. A. Elko et al, Ser. No. 07/860,380 (Docket Number PO991006); "Sysplex Shared Data Coherency Method and Means" by D. A. Elko et al, Ser. No. 07/860,805, (Docket Number PO991052); "Method and Apparatus For Distributed Locking of Shared Data, Employing A Central Coupling Facility" by D. A. Elko, et al., Ser. No. 07/860,808, (Docket Number PO991059); "Command Quiesce Function" by D. A. Elko et al, Ser. No. 07/860,330, (Docket Number PO991062); "Storage Management For A Shared Electronic Storage Cache" by D. A. Elko et al, Ser. No. 07/860,807, (Docket Number PO991078); "Management Of Data Movement From A SES Cache To DASD" by D. A. Elko et al, Ser. No. 07/860,806, (Docket Number PO991079); "Command Retry System" by D. A. Elko et al, Ser. No. 07/860,378, (Docket Number PO992002); "Integrity Of Data Objects Used To Maintain State Information For Shared Data At A Local Complex" by D. A. Elko et al, Ser. No. 07/860,800, (Docket Number PO992003); "Management Of Data Objects Used To Maintain State Information For Shared Data At A Local Complex" by J. A. Frey et al, Ser. No. 07/860,797, (Docket Number PO992004); "Recovery Of Data Objects Used To Maintain State Information For Shared Data At A Local Complex" by J. A. Frey et al, Ser. No. 07/860,647, (Docket Number PO992005); "Message Path Mechanism For Managing Connections Between Processors And A Coupling Facility" by D. A. Elko et al, Ser. No. 07/860,646, (Docket Number PO992006); "Method And Apparatus For Notification Of State Transitions For Shared Lists of Data Entries" by J. A. Frey, et al., Ser. No. 07/860,809, (Docket Number PO992007); "Apparatus And Method For List Management In A Coupled DP System" by J. A. Frey, et al., Ser. No. 07/860,489, (Docket Number PO992009); "Interdicting I/O And Messaging Operations In A Multi-System Complex" by D. A. Elko, et al., Ser. No. 07/860,489, (Docket Number PO992010); and Method and Apparatus for Coupling Data Processing Systems" by D. A. Elko, et al., issued as U.S. Pat. No. 5,317,739 on May 31, 1994.

BACKGROUND OF THE INVENTION

This invention relates to the field of general purpose computer systems which share data in a single or multi-system configuration (a SYSPLEX). More particularly, it relates to performing conditional operations on shared data within a shared coupling facility in such a configuration.

As is known, processes or applications executing concurrently in a central electronic complex (CEC) or in a system complex (Sysplex) comprising two or more CEC's coupled together can compete for access to shared resources such as external data.

Customarily, an operating system is provided in a CEC, which consists of software that controls execution of programs. An operating system is typically enabled to schedule events, control the execution of processes and schedule their access to resources. In this regard, an operating system facilitates orderly access to resources by implementing sequencing mechanisms that serialize the access of competing processes to shared resources.

As described in Hwang and Briggs, "Computer Architecture and Parallel Processing", 1984, one method of resource use serialization of competing processes involves a synchronization mechanism that utilizes a shared variable whose condition indicates the status of a shared resource. Access of a process to the resource is signalled by the variable being placed by the process into a "busy" condition, which indicates unavailability of the resource to other processes requiring use of it. When a process observes that the shared variable has an "available" or "unbusy" condition, it will be able to obtain the resource for its own use.

Mutual exclusion of access to shared resources, according to Hwang and Briggs, can be implemented by a sequence of instructions forming a part of an operating system that define "lock" and "unlock" operations. For the lock operation, a process executes against a resource status variable (RSV) by inspecting its current condition and, when the condition is other than busy (unlocked), setting the RSV to busy (locking it), and then using the resource. Then, when use of the resource is completed, the process executes against the RSV in an unlock operation wherein the RSV is set to a nonbusy condition. Under this construct, a process has exclusive control over the resource once it "locks" the lock; other processes cannot gain entree until the controlling process "unlocks" the lock.

To preclude the ambiguous circumstance where one process detects a nonbusy condition before a competing process set the RSV to "busy", the IBM System 370 extended architecture (as described in IBM Publication No. SA22-7085-0) provides a family of atomic operations that test and modify an RSV held at a storage location in a single read-modify-write instruction. The atomic operations are completed so that the RSV is not tested and set by another process before the currently-executing process completes its operation. Thus, the operations are "atomic" in the sense that they either succeed completely in altering the condition of the RSV or fail, in which case the RSV is left unchanged.

Obermarck, U.S. Pat. No. 4,399,504 teaches lock management to control access to data resources shared by two or more central electronic complexes. Obermarck is instructive in one of the principal limitations of presently-utilized lock operations: the requirement that waiting processes suspend operations when contending for shared resources.

Methods other than lock setting are also available to serialize access to shared resources. Roever, U.S. Pat. No. 4,189,771 describes a single thread, contention-free process for detecting deadlock from a vector of process wait relations. Carlson et al., U.S. Pat. No. 4,410,940 provides for transfer of control among hierarchically related processes through the use of pointers to traverse an activity. Chatfield, U.S. Pat. No. 4,183,083 utilizes a form of dynamic scheduling to increase throughput in a multiprogrammed computing system.

Process synchronization, implemented by interprocess communication, is also used to serialize utilization of shared resources. Interprocess communication involves passing data across message interfaces between processes. This is typically referred to as "loose coupling". Loose coupling by processor intercommunication places reliance on pattern and content of message traffic. Moreover, it is often the case that communicating processors may share only a few physical resources such as the network or secondary storage. Securing mutual exclusion of resource access while avoiding mutual blocking or suspension has led to embedding language/algorithmic constructs within the competing processes or embedding such constructs in the form of monitors in operating systems. A well-known software solution in this regard has been contributed by Dijkstra in "Cooperating Sequential Processes", PROGRAMMING LANGUAGES, Academic Press, 1968.

For performance reasons, it is important to minimize the amount of communication required between systems in a SYSPLEX.

Prior art required multiple interactions between concurrently executing processes to establish and release serialization for individual or multiple requests to access shared data.

It consisted of explicit serialization across multiple executions of a command in order to block intervening updates to the shared data objects. In many cases, such strong serialization is unnecessary and results in undesirable resource contention, performance degradation, and complex recovery logic.

GENERALIZED LOCKING PROTOCOL

When sharing data on an external device, a general locking protocol makes extremely costly the performance overhead of using such data for many of the process requirements which could otherwise be satisfied in a single data access.

Typically, the method employed by programming to gain the exclusive right to update a shared data object consists of multiple steps, each of which results in potentially unnecessary and undesirable resource contention, performance degradation, and complex recovery logic.

Consider the following example in which a program intends to read the contents of the data object and change its state to "b" only if the current state of the object is "a".

1. The program acquires an explicit exclusive lock, multisystem in scope, to block concurrent access to the target shared data object
2. The program accesses the object (transfers its contents to the CPC), and determines its current state
3. If the state of the object is not "a", the program proceeds to step 5
4. The program performs a write-access to the object to update its state to "b"
5. The program releases the exclusive lock The above scenario includes two physical round trips to a shared lock facility. The above scenario also includes two physical accesses to the shared data object. The scenario may also result in undesirable contention and intersystem signalling due to use of an explicit lock. Also note that the physical transfer of the data was unnecessary when the state of the object was not "a".

In an environment where the majority of accesses can be accomplished in a single, atomic command such as in the case with the SES list entries, such a protocol is not desirable.

Certain programming protocols require the ability to have multiple individual commands processed without intervening operations being executed on behalf of other processes which execute in parallel in a Sysplex configuration.

The need exists for multiple operations to be performed on behalf of a particular process without commands presented to an external device on behalf of other processes accessing the set of objects being manipulated by the first process. For example, programming protocols exist which require a process to view all the entries on a particular list. In order to correctly view all the entries on a particular list, no entries must be added or deleted to that list by other processes. In another example, it is required that an entry be placed on each of two lists before the results of the process are made visible to other processes.

DASD KEY OBJECTS AND SEARCH KEY EQUAL CHANNEL COMMANDS

In the prior art (e.g., as described in IBMs 3990 Storage Control Reference Manual, GA32-0099-1), channel command words (CCW's) are described which enable programming to set and compare the key field of a Count/Key/Data DASD architecture device. As is described in that architecture, CCW's can be chained together and are executed one at a time. For the duration of a given channel program, the device maintains an allegiance with the interface over which the channel program is executing (see, e.g., IBM's Enterprise Systems Architecture/370 Principles of Operation, SA22-7200-0). Operations which set or test the key field can be followed by operations which access shared data. However, no ability exists to insure atomic actions on the key and shared data areas. It is the responsibility of programming to institute protocols to detect and correct errors which occur when a process accesses data residing on a shared DASD device.

In prior art, such as the DASD key mechanisms, comparison of the serialization point and execution of the subsequent requests are not atomic. Individual channel command words are required to establish the serialization point and access data Between these two operations errors can occur which require complex programming protocols for error detection and recover.

Single CPC Operations

In the aforementioned ESA/370 Principles of Operation, the CS and CDS ESA/390 CPU instructions are described which provide the compare and replace function on locations within main memory.

General Data Base Locking

A known mechanism achieves serialization of shared data resources through a general data base locking protocol. The general protocol requires that a serialization point be established and acknowledged by all processes which share access to the data. After such a serialization point has been established, the shared data is accessible. When access to the shared data is no longer required, the serialization point is released. Significant complexity and system performance degradation occur as this locking mechanism requires multiple interactions between the processes which concurrently execute and access the shared data.

SUMMARY OF THE INVENTION

This invention describes a configuration which enables a network of CPCs (101 to 104) to issue requests to and receive responses from a coupling facility. The coupling facility described herein is a Structured External Storage processor (SES 110).

One or more programmed-applications 105 to 108 on one or more processors (central processing complexes, or CPCs 101 to 104) share lists 109 of data entries that exist in the SES 110 which is shared by the plurality of processors. One or more lists of data elements are defined to exist in a SES device which are shared among multiple users. Management of the lists of data entries is performed in the SES facility and relieves the list user application of the burden of storage management for shared data.

Programming can request the SES 110 to perform commands or operations which are designed to return data and status information. A set of such operations are described in this invention. The individual commands operate atomically as viewed by all other processes across all CPCs attached to the SES.

The mechanisms described in this invention provide the means by which programming can associate a serialization point with an arbitrary set of objects and allow individual commands to access those objects without performance penalty by processes which do not require serialization among each other.

The mechanisms described in this invention also provide the means by which programming can enable execution of processes which require serialization across multiple SES list commands.

Checking of the serialization point and execution of the associated command is atomic as viewed by other processes and either executes to completion or does not change the state of the referenced SES objects.

If the comparison of the serialization point is not successful, execution of the command is suppressed, and data is returned which reflects the associated process which holds the serialization in a manner which is atomic with the execution of the SES command.

Additionally, the present invention provides for limiting the size of a particular list. This is accomplished by defining lists in terms of list entries, and list entries in terms of list elements, and allowing the creator of a list structure to set thresholds for the maximum number of list entries in a list, or list elements in a list. A count of the number of entries or elements in a list is maintained on a list basis, and modified as list entries are created, moved, and deleted. In this manner the potential for a defective application to usurp a disproportionate amount of SES storage allocated to the structure is reduced.

It is an object of the present invention to provide a mechanism for serialized access to shared external data that permits operations on such data without the need for a separate external reference to first obtain a lock.

It is a further object of this invention to provide for the conditional execution of commands which create or replace data on external storage based on the current existence of a data item at the external storage within the scope of a single command.

It is a further object of this invention to provide efficiently for data integrity by providing operations that permit version number checking for data on external storage within the scope of a single command.

It is a further object of this invention to provide for the conditional execution of a command which references a data item at the SES as determined by the list on which the data item currently resides.

It is a further object of this invention to reduce the possibility of aberrant processes accumulating excessive amounts of available list storage by providing for thresholds that may be set for lists.

BRIEF DESCRIPTION OF THE DRAWINGS

FIGS. 4A, 4B and 4C are block diagrams illustrating the structure and contents of a message command block and message response block.

FIG. 5 is a flowchart showing the overview of the process for verifying presumed state.

FIG. 9 is a flowchart showing the create/replace process for write-list-entry SES command.

FIG. 10 is a block diagram illustrating sample contents of a Lock Table object in the SES facility.

DESCRIPTION OF THE PREFERRED EMBODIMENT

Overview

Figure 1:
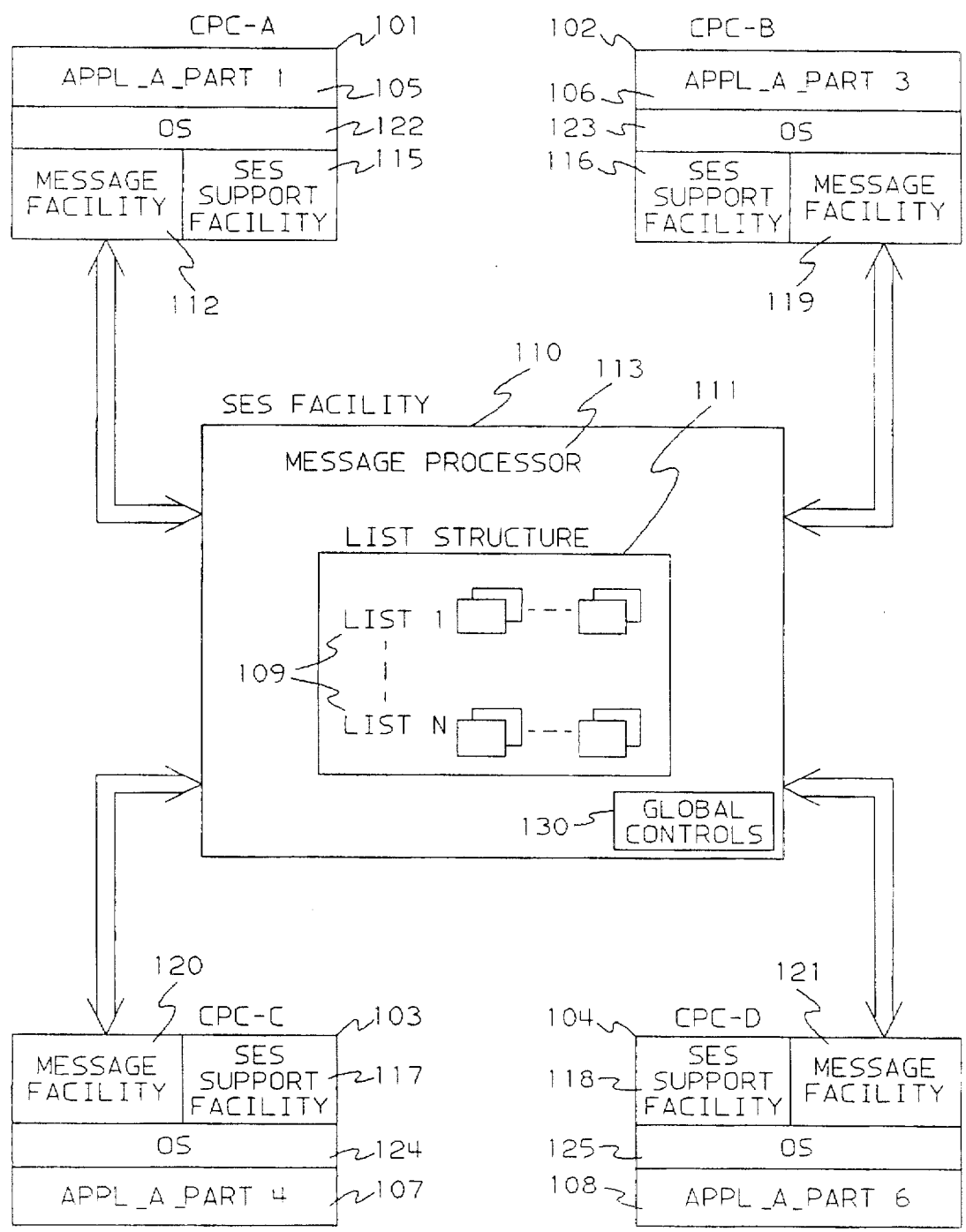
FIG. 1 is a block diagram illustrating the environment in which programmed-applications in different CPCs are sharing a List in the SES device.

One or more programmed-applications (users 105 108) on a plurality of processors (central processing complexes, or CPCs 101–104) share structures 111 of list objects that are defined and exist in a shared, structured external storage device (a SES device 110) which is shared by the plurality of processors. Management of the list objects is performed within the SES facility 110 and relieves the list user applications 105–108 of the burden of:

1. Verification of the presumed state of list-entry objects.
2. Serialization of accesses to list-entry objects 302 in the list structure 111.
3. Accessing the SES device beforehand to determine if a subsequent request to create/replace list-entry objects 302 will be successful.

Individual command operations executed by the SES facility are designed to operate atomically.

Mechanisms are described for providing the ability for a program 105–108 having access to the storage device to conditionally operate upon target data objects based on the successful verification of the presumed state of the object, to optionally and independently change the verified presumed state of the object to another specified state, and to then perform an operation on the object (such as read, replace, move, delete). The functions in the SES facility 110 provide the above support in a single atomic operation at the storage device without the need for explicit serialization obtained by the program for the purpose of blocking ongoing concurrent operations and without requiring multiple accesses to the storage device.

In addition, if the verification of the presumed state fails, the operation at the SES is suppressed, the current list entry controls are returned, and the expense of transferring the data object over the link to the CEC is avoided.

Certain programming protocols require the ability to have multiple individual commands processed without intervening operations being executed on behalf of other processes which execute in parallel in a Sysplex of CECs. A mechanism is described for achieving the required serialization of multiple individual commands at high performance and under programming control.

The mechanisms provide the means by which programming can associate a serialization point with an arbitrary set of objects and allow individual commands to access those objects without performance penalty while also enabling execution of processes which require serialization across multiple commands.

Typically, when data is stored, it is necessary to know whether or not the storage is allocated. The SES list structure allows the program to optionally specify that a list entry should be replaced if it already exists or created if it does not. The program does not have to provide explicit serialization since the operation executes atomically.

THE PROCESS OF VERIFICATION AND ATOMIC OPERATION

A set of objects and command operations against those objects are defined at the SES. Programming protocols utilize these commands and objects to insure efficient execution of individual SES list commands while enabling serialized access across multiple SES list commands when required.

Figure 2:
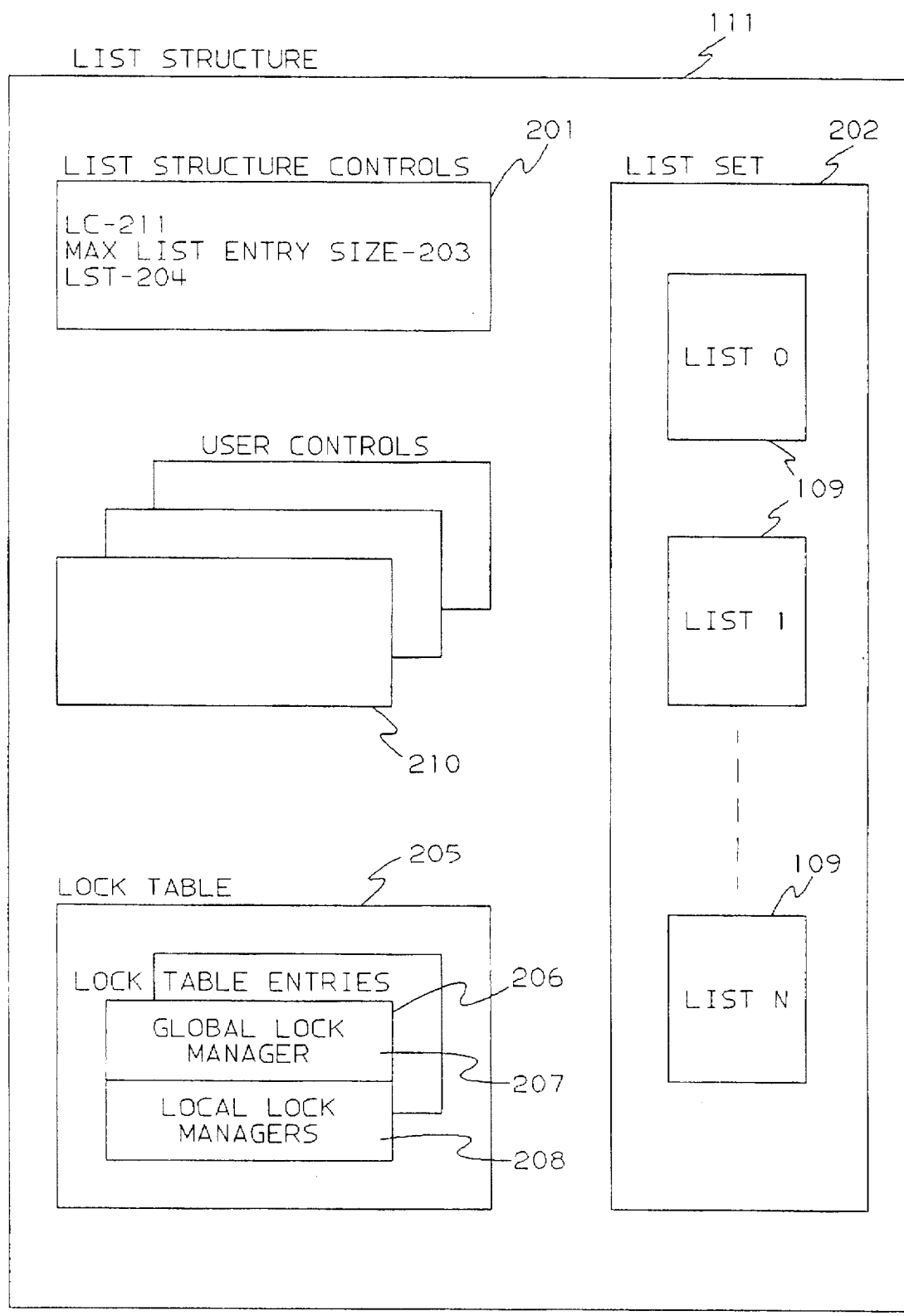
FIG. 2 is a block diagram illustrating the overview structure of a List Structure in the SES facility.
Figure 3:
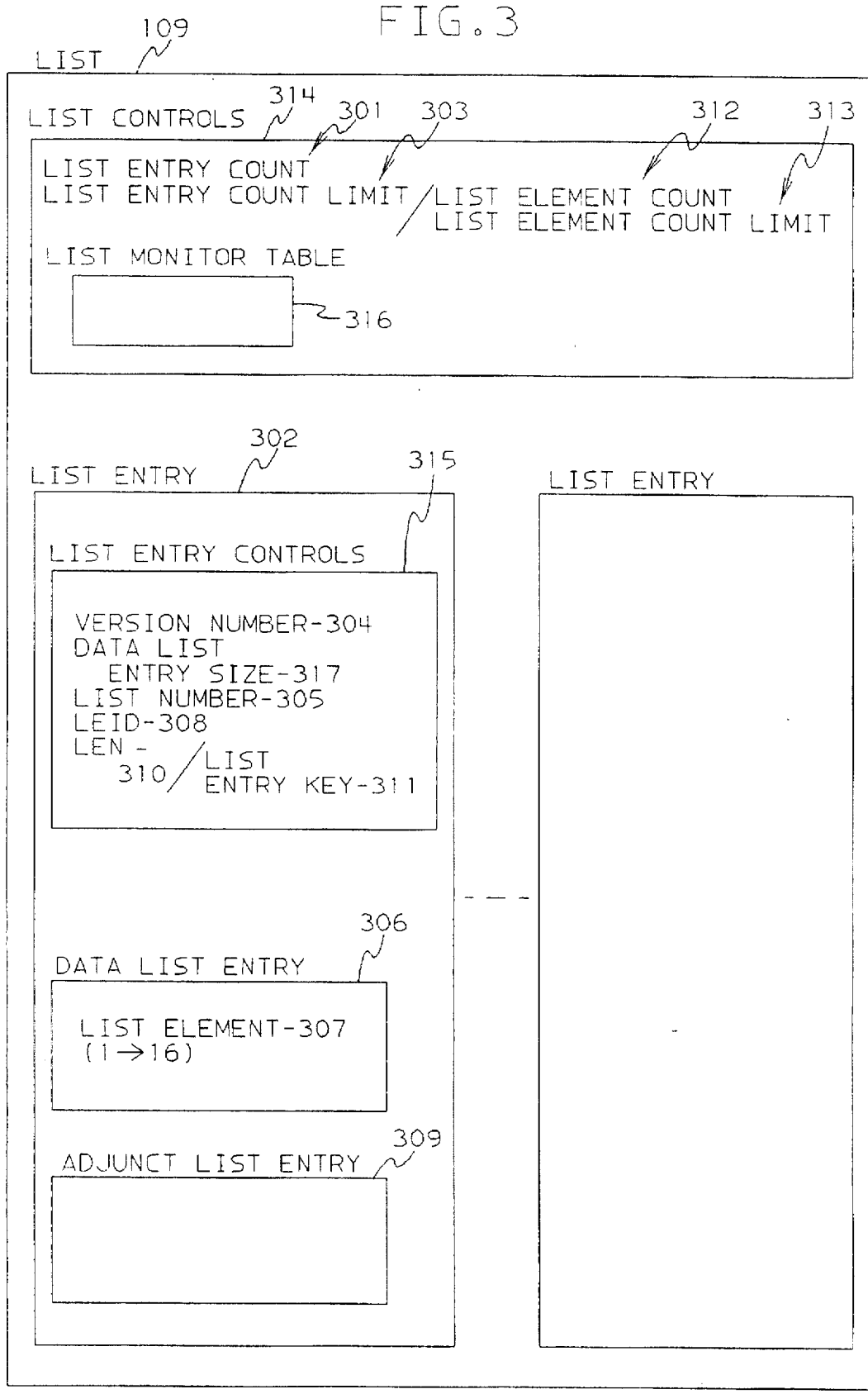
FIG. 3 is a block diagram illustrating the structure of a List objects in the SES facility.

FIGS. 2 and 3 show the objects in a list structure 111 which are defined and exist in the SES 110 and are relevant to this invention. There is a separate section in this document which describes the contents of the objects and their relationships to the objects that are diagrammed in these two figures.

The storage objects and processes are accessed using commands issued by the program. Commands are packaged in a message command block 409, and are communicated from the message facility (112, 121, 119, 120) to the message processor 113 via the Send Message instruction. The message processor returns the summarized results of the operation in the message response block 417.

Figure 4A:
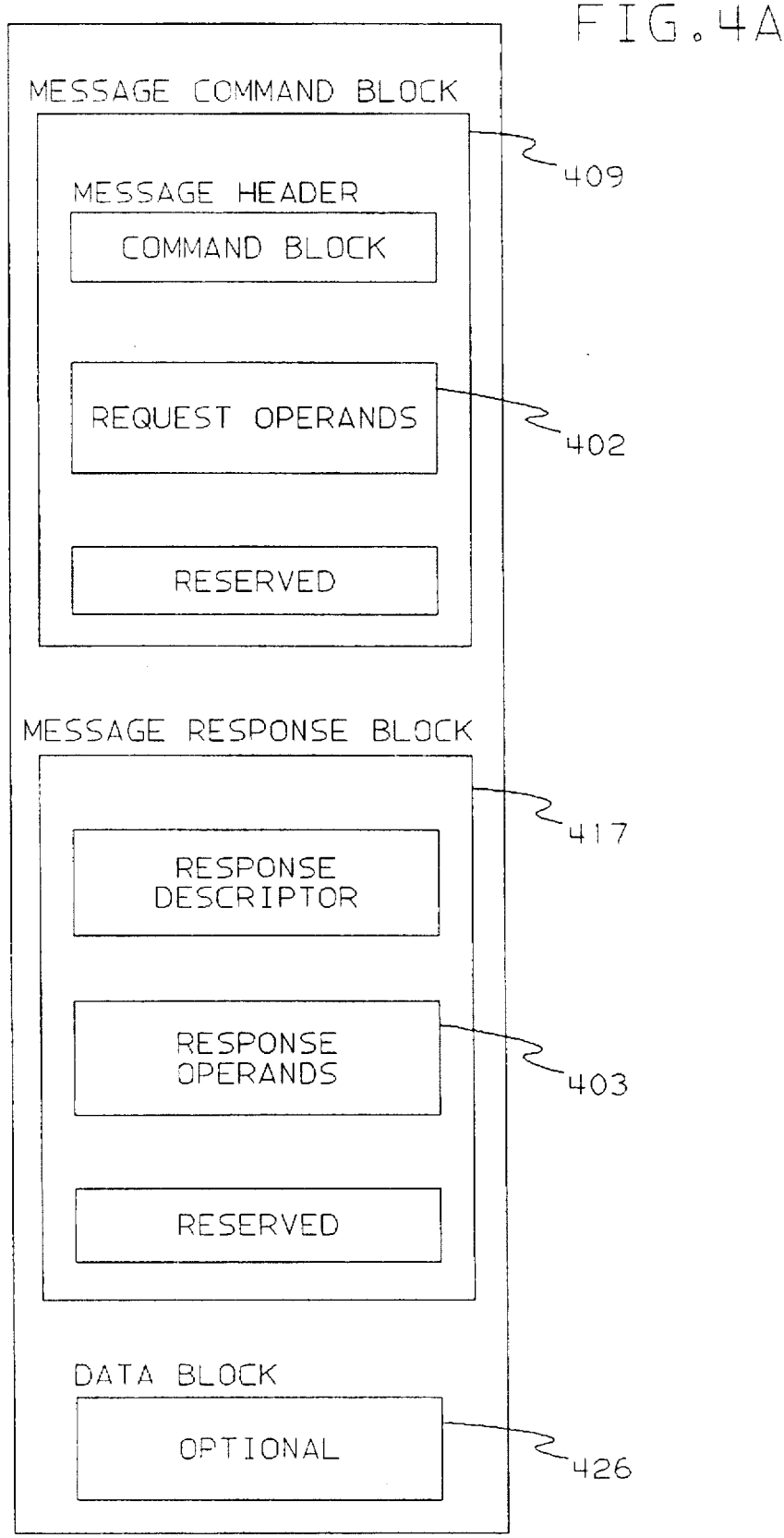
Figure 6:
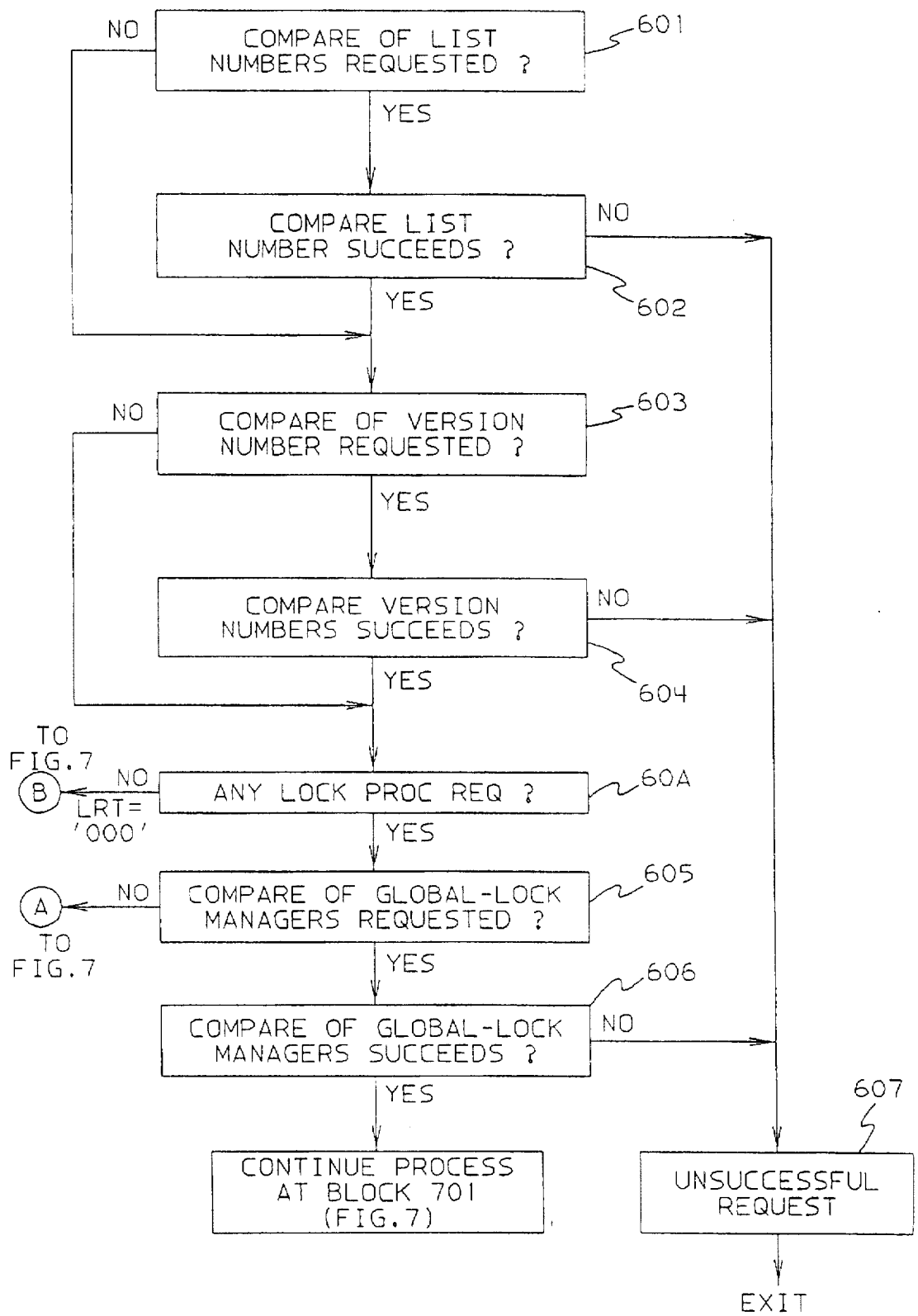
FIG. 6 is a flowchart showing the state verification process within an individual SES list command.
Figure 7:
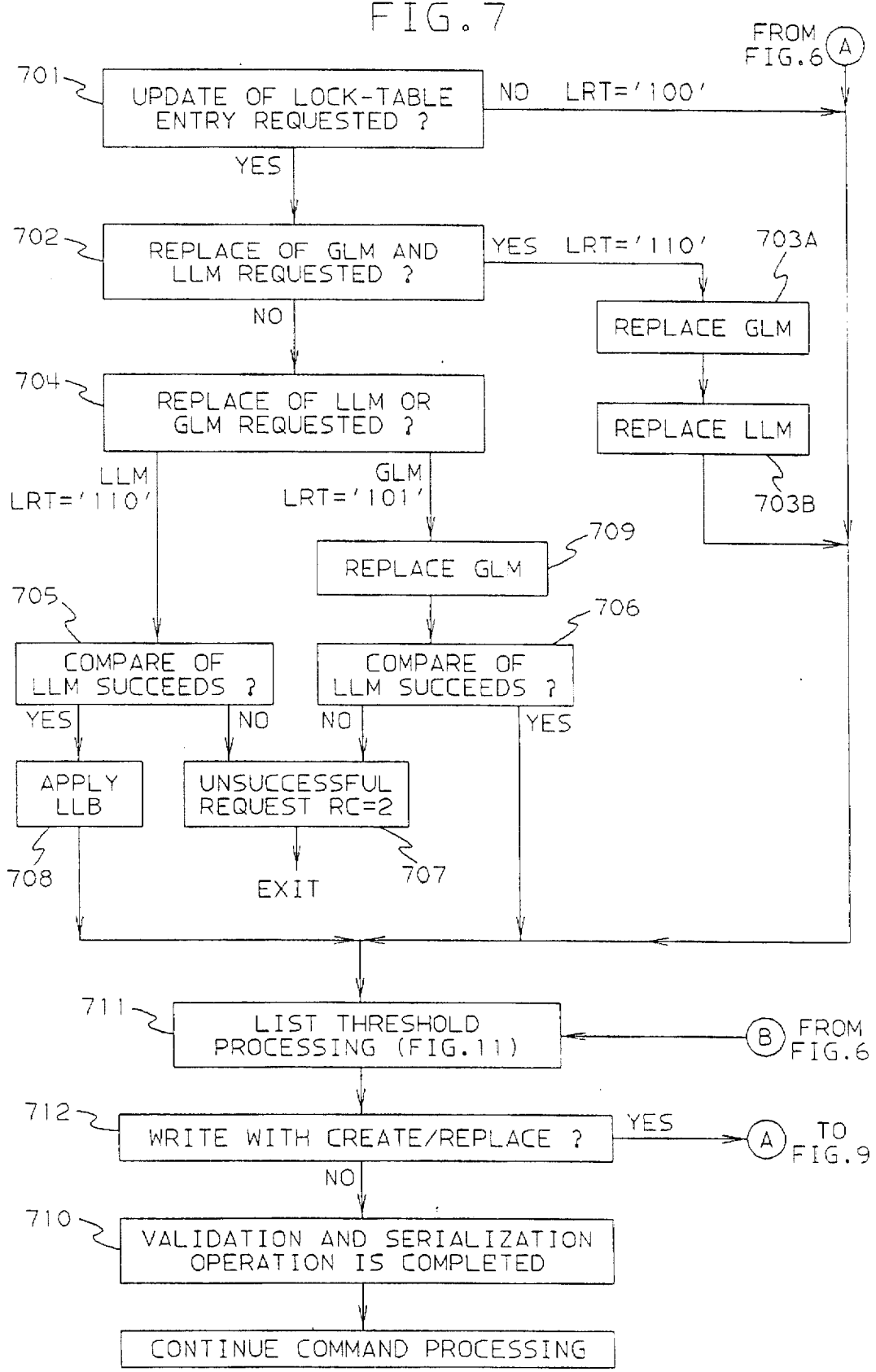
FIG. 7 is a flowchart showing the lock comparison and replacement processes within an individual SES list command.

FIG. 4 shows the structure of a message command block 409 with emphasis on the command operands which are relevant to this invention and can be specified by programming in the request operands 402, and the structure of the response operands object 403 which is returned to the program 105 when the list-structure commands complete their processing.

Programming is provided the means to govern state changes against the shared data objects in a way that ensures no updates are lost. Programming instructs the SES 110 to apply changes to shared list entries 302 only when the current state of the entry can be determined and verified, by the SES during execution of the command.

FIG. 5 describes an overview of the interaction between a CPC based program which is processing list and lock objects, and the SES based command processors which must verify the presumed state of the objects of interest (predicate funtion 510) and then conditionally allows the command process (data function 511) to be executed.

The allocate-list-structure command creates (FIG. 5 at 501) the list structure 111 including the associated lock-table 205 based on specification of the Lock-table-entry characteristic (LTEX 425) and Lock-table-entry count (LTEC 427) and lists based on the specification of the list-element-characteristic (LELX 462), the maximum data-list-entry size (MDLES 437) and the list count (LC 433).

Lock table entries 206 are created in an initialized state with available global lock manager 207 and local lock manager 208 objects.

The list commands also provide a means for conditionally creating, reading, replacing, moving, deleting, writing and moving, reading and deleting, or moving and reading one list entry 502. List entries are accessible by means of a SES provided list-entry identifier 404, a program provided list-entry name 405, or by position in the list. This list position is specified as either leftmost or rightmost position 406, or as a keyed position.

State and lock verification is an operation that is common to the single-list-entry commands. Single-List-Entry Commands include the commands Read list entry, Write list entry, Move list entry, Delete list entry, Write and move list entry, Move and read list entry, and Read and delete list entry.

The state of a list entry 302 and a lock entry 206 may be tested to conditionally determine execution of a list command. The state of a list and/or lock entry is determined at 503 by:

1. The list 109 in which the entry resides, as indicated by the list number 305.
2. The version number of the entry, as indicated by the version number 304.
3. The state of the specified lock-table entry 206, as indicated by the associated global lock manager 207 and local lock manager 208.
4. Whether or not the list (109) is in a full condition.
5. Whether or not the list entry 302 exists, for write operations requesting conditional create/replace.

If the verification of the presumed state fails 504, the operation is suppressed and an indicative (not-successful) response code 407 is passed back to the program. If global lock manager replacement is requested, the global lock manager is replaced even if the local lock manager comparison fails and the rest of the command is suppressed.

If the verification of the presumed state is successful, (503 and 505A) the state may be updated (505B), the command processor completes its execution and a successful response code 407 is passed back to the program.

The list entry controls (315) (including the version number (304) list number (305), LEID (308), LEN (310) and LEK (311) (if name or keys exist)), are returned 506 in the response operands 403 of all single list entry, read list, and read list set SES commands.

When lock-manager comparison fails, the lock-table-entry value (LTE 485) and an indicative response code 407 are returned.

The program examines the response operands (403) at 507. If the response indicates success, the program 505 continues to its next interaction with the SES list structure (111).

If the response indicates a not-successful request, the program understands that previously issued command did not execute the desired operation. The program executes contingency processing 508 which determines what action is needed before it can resume its interaction with the list objects.

Details of conditional command execution are described in the following with reference to FIGS. 6, 7, 9 and 11 as further expansion of FIG. 5 at 503.

List Number Comparison

The Entry-Locator Type 429 is examined to determine if list number 423 and 305 comparison is requested 601. A field in the ELT 429 indicates:

1. Do not compare the list numbers
2. Compare the list numbers

The LN operand (423) on the list command is compared at 602 to the entry list number (305) which specifies the number of the list 109 on which the entry exists. When the list numbers match, a successful comparison 602 allows the command to continue its execution. If the list numbers do not match, the initiated operation against the designated list entry 302 is not performed and an indicative response code 407 is returned 607.

Version Number Comparison

If the version request type (422) specifies comparison 603 of version numbers, the value in the command operand 421 is compared 604 to the version number object (305) in the target list entry controls object (315). If the version numbers are not equal, the initiated operation against the designated list entry (302) is not performed and an indicative response code (407) is returned.

If the version numbers (421 and 305) are equal 604, the comparison is successful and the command continues its execution.

On successful completion of a SES list command the version number of a list entry (304) may be updated as specified by the command through the version request type 422. The version number associated with the list entry may be incremented, decremented, or replaced by the value specified by the command (411). If the comparison of version numbers fails, the initiated operation against the designated list entry is not performed and an indicative response code is returned.

Example of Version Number Verification

Consider the use of a version number in the scenario described in the prior art in which a program intends to read the data object and change the state of the object to "b" only if the current state of the object is "a".

The program sends a read command request to the SES facility and specifies a version-request-type 422 of compare and replace version number, a compare version number 421 of "a", and a (replacement) version number 411 of "b".

Note that no explicit locks were obtained and only one physical access to the SES facility was required. In addition, if the compare of the version numbers 304 and 421 fails, the operation at the SES is suppressed, the current list entry controls (VN 408, LEID 410, LN 430, LEK 449 or LEN 448, DLES 451, RC 407) are returned, and the expense of transferring the data object over the link to the CPC is avoided.

Lock Table Entry Processing

For the locking processes of comparison and replacement, command execution is conditionally performed, and is based on specification of the lock-request type (LRT 412), Local-lock bit value (LLB 413), and Lock-table-entry number (LTEN 414). When the global-lock managers (415 and 207) are compared, the local-lock manager as specified by the user identifier 418 and the local lock manager 208 are optionally compared. In order for the command to perform the requested list entry process, the requested lock processes must succeed. In order for the command to perform global lock manager replacement, it is not necessary for local lock manager comparison to succeed.

Global-lock-manager comparison is bypassed 60A if the lock-request-type (412) indicates no lock process requested.

If the list-structure type (LST) (204) indicates that the lock table was created and the lock-request-type (412) indicates compare global-lock-managers 605, then comparison of the global-lock-mangers occurs 606.

Global-lock-manager comparison 606 is always requested (605) before a lock-table entry (206) is written; or it is conditionally requested (605) before a list entry (302) is created, replaced, read, moved, or deleted, depending on the command and lock-request type (412).

When they match, the global-lock-manager comparison succeeds, and the command continues. When they do not match, the global-lock-manager comparison fails, and the lock-table-entry value (LTE 455) and indicative response code 407 are returned in the response operands (403).

The global-lock-managers (207) from the specified lock table entry (414) and the CGLM operand 415 are compared 606 when global-lock and local-lock-managers replacement is requested (702).

One or both of the objects contained within a lock-table entry (206) are replaced, depending (FIG. 7 at 701) on the lock-request type (412) specified.

When the LRT (412) specifies replace global and lock managers and the global-lock-manager comparison succeeds 606, the global-lock-manager (207) is replaced 703A with the user identifier (418) specified and the local-lock-managers (208) are replaced 703B with the local-lock-managers (416) specified.

Local-lock-manager comparison 705 occurs before a lock-table entry 206 is written or before a list entry 302 is created, replaced, read, moved, or deleted depending on the command and lock-request type 412.

When a local-lock-manager 208 object exists and a global-lock-manager replacement is requested (GLM path from 704) via the LRT 412, the global-lock-manager object (207) is replaced with the specified user identifier (418) at 709, the local-lock-manager-object value is ANDed with a mask of all ones except for the local-lock bit corresponding to the user identifier 418 specified. This ANDed value is then compared 706 with zero. When they match, the local-lock-manager comparison succeeds. When they do not match, the local-lock-manager comparison fails and an indicative response code (407) is generated at 707.

When a local-lock-manager object 208 exists and a local-lock-manager replacement is requested (the LLM path from 704), the local-lock bit corresponding to the user identifier specified is compared 705 with the local-lock bit value (413) specified. When they match, the local-lock-manager comparison fails. When they do not match, the local-lock-manager comparison succeeds.

When the local-lock-manager comparison fails, an indicative response code 407 is generated 707.

When the local-lock-manager comparison succeeds, the local-lock bit corresponding to the user identifier (418) specified is replaced 708 with the local-lock-bit-value (413) specified.

List Threshold Processing

Figure 11:
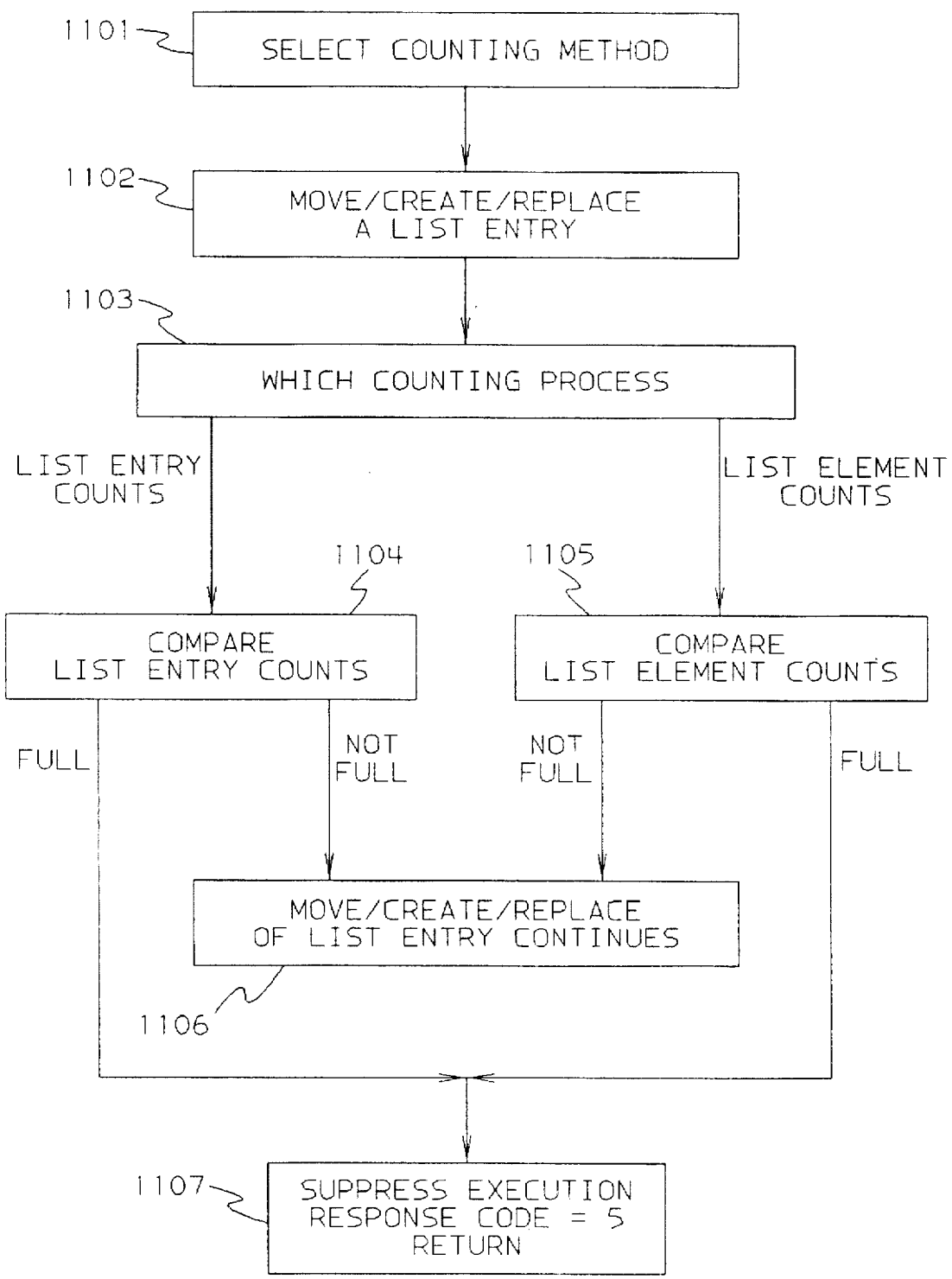
FIG. 11 is a flowchart showing the process for detecting "list full" conditions.

FIG. 11 illustrates list threshold processing.

A list structure (111) is created on the first successful invocation of the allocate-list-structure command for a structure that does not already exist.

The type of count and limit that exists in the list controls is defined at allocation in the specified LST operand 447. This determines the counting method used 1101 in list threshold processing (list entries, or list elements).

The limits (303 or 313) may be changed by means of the write-list-controls command and read by means of the read-list-controls command.

When the counter indicator in the specified list-structure type (204) specifies that a list entry count and list entry count limit are defined and allocation is successful, the list controls (314) for each list (109) contain list-entry count (301) and a list-entry-count limit (303). When the counter indicator in the specified list-structure type specifies that a list element count and list element are defined and allocation is successful, the list controls for each list contain list-element count (312) and a list-element count limit (313).

The limit is compared with the count whenever a list entry 302 is created, moved, or replaced 1102.

The list-element counts (312) are updated 1106 whenever a list entry (302) is created, deleted, replaced, or moved to another list 109 and the count indicator in the list-structure type (204) specifies a list element count exists. (Counts are updated in both target and source lists for a "Move".)

The list-entry counts (301) are updated 1106 whenever a list entry (302) is created, deleted, or moved to another list (109) and the counter indicator in the list-structure type (204) specifies a list entry count exists. (Counts are updated in both target and source lists for a "Move".) The list-element-count-limit object (313) is compared 1105 with the list-element-count (312) whenever a list entry (302) is added (created or moved) to the list, or replaced with a change in size (the list entry size is specified in the Data List Entry Size (316) field of the List Entry Controls) and the counter indicator in the list-structure type (204) specifies a list element count exists. The new list element count is the sum of the former list element count (312) and the net add due to the new entry. If the new list element count matches or exceeds the list-element-count limit (313), then the list (109) is full. When the list (109) is full, no objects are updated and an indicative response code (407) is returned 1107.

The list-entry-count-limit object (303) is compared 1104 with the list-entry-count (301) whenever a list entry (302) is created or moved and the counter indicator in the list-structure (204) is zero. A list (109) is full when the number of list entries created matches or exceeds the list-entry-count limit (303). When the list (109) is full, no objects are updated and an indicative response code (407) is returned 1107.

Create/Replace List Entry Processing

The SES list structure allows the program to optionally specify that a list entry 302 is to be replaced if it already exists or created if it does not. Also, since the commands that perform the create/replace process execute atomically, the program does not have to provide explicit serialization while obtaining this information.

The program can request:

1. Unconditional replacement of a list entry,
2. Unconditional creation of a list entry, or
3. Conditional replacement or creation of a list entry.

Typically, when data is stored, it is necessary to know whether or not the storage is allocated. The SES list structure 111 allows the program to optionally specify that a list entry 302 be replaced if it already exists or be created if it does not. This eliminates first time logic in the program and allows for better performance, since the program does not need to know (through a request to the SES 110) or find out whether the list entry exists or not. Also, since it executes atomically, the program does not have to provide explicit serialization while obtaining this information.

One example of when a program would like to replace or create a list entry 302 is when the list entry represents recovery information and the program knows that any previously existing data of the same name is by definition older than the new data being written. In this case, the program does not care whether or not old data exists, it simply wants to write the new data.

The option to replace or create a list entry 302 is controlled by the write-request type 420.

List entry 302 creation 904 is requested on a write-list-entry command and the write-and-move-list-entry command, depending on the write-request type 420 specified. FIG. 9 is a diagram of the process flow for the create/replace process that occurs in the above mentioned two commands.

Creating a List Entry

Examine 901 the write-request type 420 to determine if it specified unconditional list entry creation.

When a write-request type specifies create, list-entry creation is unconditionally requested (Y path from 901); if list-entry name (310) already exists 902, an indicative response code 407 is returned 905.

When a write request type (420) specifies replace or create is specified, and the designated list entry does not exist ("N" path from 907), list entry creation is performed 904.

When the list set (202) and list (109) is not full and list-entry creation is requested, a list entry 302 is created 904.

A list entry (302) is created at the first entry position relative to the designated position 903, and the relative position of all succeeding entries is increased by one.

Replacing a List Entry

A list entry 302 can be replaced 910 on a write-list-entry command.

When a write-request type 420 specifies a replace or specifies a replace or create 906 and the designated list entry (302) exists 907, the list entry is replaced 910.

When a write-request type 420 of replace is specified and the designated list entry (302) does not exist 909, an indicative response code (407) is returned 905.

The position of a list entry (302) is not affected when it is replaced 910.

The processing of the list entry 302 continues 710 within the command that performs this process of state validation and serialization.

Advantages of Conditional Atomic Command Execution

The described mechanisms allow programs having access to a shared external storage to conditionally operate upon target data objects based on the successful verification of the presumed state of the object, and to optionally and independently change the verified presumed state of the object to another specified state in a single atomic operation. The following advantages are realized through use of the described mechanisms:

1. Costly explicit intersystem locking is reduced resulting in less contention for the locks, less contention for the physical paths to the locking facility, less contention at the locking facility, and less contention in the system software which manages the facility.
2. The number of accesses to the shared external storage is reduced resulting not only in improved path length for the request but also in less intersystem contention at the storage facility and on the physical paths to the facility.

3. Information related to the current state of the accessed data objects are returned in the command response area to the program for its inspection without requiring additional accesses to the facility.

4. Comparison of the serialization point and execution of the subsequent requests are atomic.

Serialization of List Entry Commands

The objects and operations described herein are utilized by programming in a wide diversity of protocols to satisfy the requirement to serialize access to a set of SES list objects across multiple SES list commands.

An example serves to illustrate the function afforded by these mechanisms. In the following example, the majority of operations are single-list-entry commands which create, read, delete, or move a list entry. Occasionally, the requirement exists to access multiple list objects associated with a particular list structure. More than one command would be used in this case.

Figure 8:
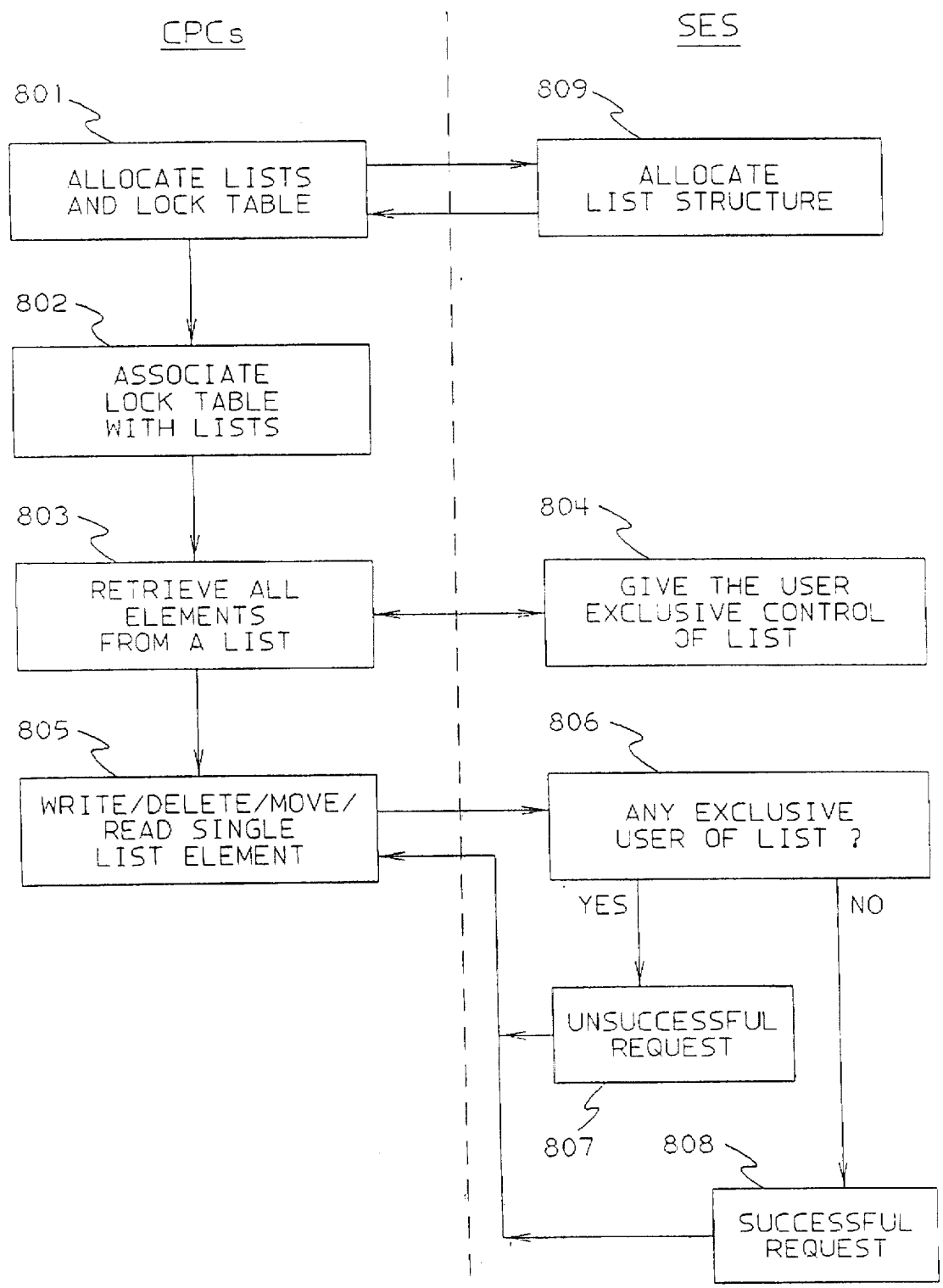
FIG. 8 is flowchart showing the process for serialization across multiple SES List commands.

FIG. 8 shows the process flow that occurs for this example.

Programming chooses to cause creation of a SES list structure at 801, through the allocate list structure command processed at 809 with at least one lock table entry 206 and a number of lists. Programming associates the first lock table entry with list number one, the second lock table entry with list number two, etc. at 802.

All requests to write, delete, move or read 805 a SES list entry (302) are combined with a lock request type (412) which compares at 807 for a zero value in the associated global-lock-manager (207).

When it is necessary to retrieve all the entries from a particular list, programming through the use of the write lock table entry command sets (at 804) the global-lock-manager value (207) to the user identifier 418 associated with the process that issues more than one list command.

Individual accesses to the SES list (109) operate at 808 correctly without contention when no process is in execution which is retrieving all of the list entries.

When a process is in execution to retrieve all of the list entries 302, single list entry requests which compare at 806 for a zero value in the global-lock-manager 207 fail at 807 and identify in the response operands the user identifier 418 associated with the process that is issuing multiple list commands.

Software protocols cause these single list entry requests to be delayed until the process reading multiple list entries (302) has completed.

Global Objects

The global objects identify the SES facility, describe its state, define its model-dependent limitations and summarize the status of its resources.

The fixed global controls are set at SES power-on reset and are not modified by any SES command.

The program-modifiable global controls are initialized at SES power-on reset and may be modified by subsequent SES commands.

The fixed global controls are summarized in the following table.

| Fixed Global Controls | Acronym |
| --- | --- |
| SID limit | SL |
| Total control space | TCS |

The program-modifiable global controls are summarized in the following table.

| Program-Modifiable Global Controls | Acronym |
| --- | --- |
| Free control space | FCS |
| Free space | FS |
| SID vector | SV |
| Total space | TS |

Free Control Space (FCS)

An object or field that specifies the amount of control stroage which has not yet been assigned and is available for assignment to a structure. The free-control-space value is initialized to the same value as the total-control-space value.

Free Space (FS)

An object or field that specifies the amount of storage which has not yet been assigned and is available for assignment to a structure. The free-space value is initialized to the same value as the total-space value and represents the largest structure size that may be allocated in the SES facility.

SID Limit (SL)

An object or field that specifies the maximum supported SID value.

SID Vector (SV)

An object or field that specifies the assigned SIDs.

Total Control Space (TCS)

An object or field that specifies the amount of storage defined in the SES control storage and available for the allocation of control objects for a structure.

Total Space (TS)

An object or field that specifies the amount of storage defined in the SES storage and available for the allocation of structures.

| List Limits | Acronym |
| --- | --- |
| List-number limit | LNL |
| Lock-table-entry-characteristic limit | LTEXL |
| User-identifier limit | UIDL |

List-Number Limit (LNL)

An object or field that specifies the maximum list number.

Lock-Table-Entry-Characteristic Limit (LTEXL)

An object or field that specifies the maximum size of a lock-table entry.

User-Identifier Limit (UIDL)

An object or field that specifies the maximum user identifier. The maximum-user-identifier value is the maximum number of list-structure users and list-notification vectors that can be attached to each list structure.

SES List Structure

A list structure consists of list-structure controls, user controls, and either a lock table, or a list set with list controls and list-entry controls, or both.

Each lock table consists of a sequence of one or more entries, which are numbered consecutively starting at zero. The list-structure type and lock-table-entry characteristic determines whether all the lock-table entries have a global-lock-manager object, a local-lock-managers object, or both.

The list-structure controls are initialized when the list structure is created. The list-structure controls contain the structure size, list-structure type, lock-table-entry count, nonzero-lock-table-entry count, lock-table-entry size, list count, list-element size, maximum data-list-entry size, maximum list-set-entry count, list-set-entry count, maximum list-set-element count, list-set-element count, user-identifier vector and user-structure controls.

The user controls are created and initialized when a list-structure user is attached. The user controls contain a list-notification token, system identifier, and user-attachment control.

Each list set consists of one or more lists, which are numbered consecutively starting at zero.

There are list controls associated with each list. The list controls contain a list-entry count or list-element count, a list-entry-count limit or list-element-count limit, a list-monitor table, a list-state-transition count, and a user list control.

Each list consists of a sequence of zero or more entries. The list-structure type determines whether all the list entries in the list set have a data list entry, an adjunct list entry, or both.

There are list-entry controls associated with each list entry. The controls contain list-entry-location information, a data-list-entry size, and a version number.

LIST STRUCTURE OBJECTS List Structure (111)

The possible list-structure objects consist of: (Reference numbers are to FIG. 2.)

List-structure controls 201
User controls 210
List controls 314
List-entry controls 315
Lock table 205
List set 202

List-Structure Controls

The fixed list-structure controls are initialized when the list structure is created and remain unchanged until it is deallocated.

The program-modifiable list-structure controls are initialized when the list structure is created. The program-modifiable control values may be changed by SES commands.

The fixed list-structure controls are summarized in the following table. (Those that are key to the present invention are shown in FIG. 2.)

| Fixed List-Structure Controls | Acronym |
|---|---|
| List count | LC |
| List-element characteristic | LELX |
| List-structure type | LST |
| Lock-table-entry characteristic | LTEX |
| Lock-table-entry count | LTEC |
| Maximum data-list-entry size | MDLES |
| Maximum list-set-element count | MLSELC |
| Maximum list-set-entry count | MLSEC |
| Structure size | SS |

The program-modifiable list-structure controls are summarized in the following table.

| Program-Modifiable List-Structure Controls | Acronym |
|---|---|
| List-set-element count | LSELC |
| List-set-entry count | LSEC |
| Nonzero-lock-table-entry count | NLTEC |
| User-identifier vector | UIDV |
| User-structure control | USC |

Note that in the definition of the terms below, the convention "<aaa">" is used in many of the figure references for defined terms. The arrow brackets "< >" indicate list structure usage of the defined term as a response operand on a list structure command. The "aaa" is the block number reference in the drawings attached to this specification. (2XX indicates FIG. 2; 3XX indicates FIG. 3; 4XX indicates FIG. 4; etc.)

List Count (LC): 211 433 <488>

An object or field that specifies the number of lists created.

List-Element Characteristic (LELX): 462 <485>

An object or field that specifies the number of bytes in each list element.

List-Set-Element Count (LSELC): <490>

An object or field that specifies the number of list elements that have been assigned to list entries or retry-data blocks, or both, in the list set.

List-Set-Entry Count (LSEC): <492>

An object or field that specifies the number of existing list entries in the list set.

List-Structure Type (LST): 204 447 <483>

A object or field that indicates the list objects created on allocation. A field contains a counter indicator (CI), a lock indicator (LI), a data indicator (DI), an adjunct indicator (AI), a name indicator (NI), and a key indicator (KI).

The counter indicator specifies that either:

a list-entry count and list-entry-count limit are defined or a list-element count and list-element-count limit are defined.

The lock indicator specifies whether or not a lock table is created.

The data and adjunct indicators specify whether:

no list set is created, list entries have adjunct only, list entries have data only, or list entries have data and adjunct in the list entries.

The name indicator specifies whether or not list entries are named.

The key indicator specifies whether or not the list entries are keyed.

Lock-Table-Entry Characteristic (LTEX): 425 <484>

An object or field that specifies the number of bytes in each lock-table entry.

Lock-Table-Entry Count (LTEC): 427 <487>

An object or field that specifies the number of lock-table entries allocated.

Maximum Data-List-Entry Size (MDLES): 437 <4B3>

An object or field that specifies the maximum size of the data list entry.

Maximum List-Set-Element Count (MLSELC): <481>

An object or field that specifies the maximum number of list elements that are available for assignment to list entries or retry-data blocks, or both, in the list set.

Maximum List-Set-Entry Count (MLSEC): <480>

An object or field that specifies the maximum number of possible list entries in a list set.

Nonzero-Lock-Table-Entry Count (NLTEC): <491>

An object or field that specifies the number of nonzero lock-table entries that exist in the structure.

Structure Size (SS): 466 <482>

An object or field that specifies the amount of storage allocated.

User-Identifier Vector (UIDV): <495>

An object or field that specifies the assigned UIDs.

User Structure Control (USC): 467 <494>

A field per structure defined by the user.

User Controls (210)

The user controls are created and initialized when a list-structure user is assigned and are deleted when the list-structure user is unassigned.

The user controls are summarized in the following table.

| User Controls | Acronym |
| --- | --- |
| List-notification token | LNT |
| System identifier | SI |
| User-attachment control | UAC |

List-Notification Token (LNT): 441

A value that specifies a list-notification vector to the system.

System Identifer (SI); <456> 605 termed LNSID System Identifier (SI): <456>605 termed LNSID A value specified by the program when a message path is activated. The system identifier is maintained in the message-path status vector and copied into the user controls when an attach-list-structure-user command is communicated over the message path.

User-Attachment Control (UAC): 475 <499>

A field per attached user defined by the user.

List Controls (314)

There is a list-controls object for every list created in a list structure. All the list controls except the list-entry-count limit and the list-element-count limit are initialized to zero when the list structure is created.

The list controls are summarized in the following table. (Significant controls are illustrated in FIG. 3.)

| List Controls | Acronym |
| --- | --- |
| List-element count | LELC |
| List-element-count limit | LELCL |
| List-entry count | LEC |
| List-entry-count limit | LECL |
| List-monitor table | LMT |
| List-state-transition count | LSTC |
| User list control | ULC |

List-element Count (LELC): 312 <4B2>

An object or field that specifies the number of list elements currently in the list.

List-Element-Count Limit (LELCL): 313 4AA <4B4>

An object or field that specifies the maximum number of possible list elements in a list. This object is initialized to the maximum list-set-element count when a list structure is created.

List-Entry Count (LEC): 301 <446>

An object or field that specifies the number of list entries currently in the list.

List-Entry-Count Limit (LECL): 303 469 <459>

An object or field that specifies the maximum number of possible list entries in a list. This object is initialized to the maximum list-set-entry count when a list structure is created.

List-State-Transition Count (LSTC): <4B1>

An object or field that specifies the number of empty to not-empty list-state transitions that have occurred.

User List Control (ULC): 472 <497>

A field per list defined by the user.

List-Monitor Table (316)

The list-monitor table contains information used to process the list-notification vector of each user who has registered interest in the state transitions of the list.

The list-monitor table is a sequence of objects, called list-monitor-table entries.

The number of list-monitor-table entries is determined when the table is created and is equal to the maximum number of list-structure users. The list-monitor-table entries are numbered from zero to the user-identifier limit.

Each list-monitor-table entry has a list-monitoring-active-bit object, a list-notification-request-type object and a list-notification-entry-number object.

List-Monitoring-Active Bit (LMAB): 608

An object or field that specifies whether the user associated with the list-monitor-table entry is monitoring the list-state transitions of the list.

When a user is not monitoring a list, all previously issued list-notification commands on behalf of the associated user for this list are complete.

List-Notification-Request Type (LNRT): 445 602

An object or field that indicates whether the list-notification-vector summaries are to be updated when an empty to not-empty state transition occurs on a monitored list.

List-Notification-Entry Number (LNEN): 442 603

An object or field that specifies a list-notification-vector entry.

List-Entry Controls (315)

There is a list-entry-controls object for every list entry within a structure. The list-entry controls are initialized when a list entry is created and are deleted when the list entry is deleted.

The list-entry controls are summarized in the following table.

| List-Entry Controls | Acronym |
| --- | --- |
| Data-list-entry size | DLES |
| List-entry identifier | LEID |
| List-entry key/list-entry name | LEK/LEN |
| List number | LN |
| Version number | VN |

Data-List-Entry Size (DLES): 317 436 <451>

An object or field that specifies the size of the data list entry.

List-Entry Identifier (LEID): 308 404 <410>

An object or field that designates the list entry. A list-entry identifier is unique to a list set and is assigned by the SES.

List-Entry Key (LEK): 311 428 <449>

An object or field that partially designates the position of the list entry in the list.

List-Entry Name (LEN): 310 405 <448>

An object or field that fully designates the position of the list entry in the list set. A list-entry name is unique to a list set at any particular instant and is provided by the program.

List Number (LN): 305 423 <430>

An object or field which designates the list that the list entry is in.

Version Number (VN): 304 411 <408>

An object or field that is conditionally compared and conditionally updated. The version number is initialized to zero when a list entry is created.

Lock Table (205)

The lock table is a sequence of objects, called lock-table entries <455>. The number of lock-table entries is determined when the table is created. The lock-table entries are numbered from zero to the lock-table-entry count less one. For a specific lock table, the entries have one size which is a power of 2 in the range of 1 to the maximum lock-table-entry size. The size of the largest lock table is limited by the free space and the size of all the controls required to support the list structure.

Each lock-table entry <455> has a global-lock-manager (GLM 207) object and an optional local-lock-managers (LLM 208) object.

A lock-table entry whose size is one byte has only a global-lock-manager object. When a lock-table-entry size is greater than one byte, the leftmost byte is the global-lock-manager object, and the remaining bytes form the local-lock-managers object. Lock tables with an entry size of one byte do not support local-lock managers. Lock tables with an entry size of at least two bytes do support local-lock managers.

The global-lock-manager object of a lock-table entry contains a field called a user identifier.

The local-lock-managers object of a lock-table entry contains a string of local-lock bits, where each bit represents a user identifier.

The lock-table objects have a value of zero when the table is allocated and may be modified by subsequent commands.

List Set (202)

The list set is a sequence of objects, called lists. The number of lists is determined when a list set is created. The lists are numbered from zero to the list count less one.

List (109)

A list is a sequence of objects, called list entries (302). The number of possible entries is determined when the list structure is created.

A list entry may also act as a retry-data block.

The relative position of a list entry in the sequence is determined when the entry is created and may be changed when any list entry is created, deleted, or moved.

A list entry is located by means of a list-entry identifier, list-entry name, or by position. The size of the largest list is limited by the free space and the size of all the controls required to support the list structure.

A list entry has up to two objects: a data list entry (306) and an adjunct list entry (309) 434 <4A1>, depending on the list-structure type.

A data-list entry consists of from one to MDLES list elements. The data-list-entry size is determined when the data-list entry is written. The adjunct-list-entry size is static.

A list entry exists when it is created and ceases to exist when it is deleted.

LIST STRUCTURE OPERANDS

The storage objects and processes are accessed using commands issued by the program. Each list-structure command has three parts:

A message-command block containing:
  Message header
  Request operands
  Reserved area
A message-response block containing:
  Response descriptor
  Response operands
  Reserved area
An optional data block, depending on the command The command descriptions contain the formats of the message-command blocks, message-response blocks, and data blocks.

This section defines the list-structure operands, except for those operands that are also objects. Operands that are also objects can be found under "Global Objects" or "List Structure Objects", with a FIG. 4 reference number beside them (indicating their use as either request or response operands).

Comparative Global-Lock Manager (CGLM): 415

A value that is compared to the global-lock-manager object.

Comparative Version Number (CVN): 421

A value that is compared to the version-number object.

Current Data Index (CDI): <4B0>

A value that indexes to the current list-entry name or list-entry identifier in the data block for the delete-list-entries command.

Data-Block Size (DBS): 4A3

A value that specifies the size of the data block.

Delete-Entries-Locator Type (DELT): 440 <4A6>

A value that indicates whether a list entry is located by list-entry identifier or list-entry name and whether or not the list numbers are compared for the delete-list-entries command.

Delete-List-Entries Count (DLEC): <4A7>

A value that specifies the number of deleted list entries.

Direction (DIR): 406

A value that indicates how the positions of the list entries are numbered relative to a designated position. The direction is either left to right, or right to left.

Entry-to-Element Ratio (ETELR): 461 <486>

A field consisting of two unsigned binary integers that specify the target for the relative number of list entries to list elements possible in the list set.

The integer specified in the first field divided by the sum of the two numbers represents the fraction of the total of the maximum list-set-element and the maximum list-set-entry count that consists of list entries. The integer specified in the second field divided by the sum of the two numbers represents the fraction of the total of the maximum list-set-element and the maximum list-set-entry count that consists of list elements associated with data list entries and retry-data blocks.

Ending Data Index (EDI): 4A9

A value that indexes to the last list-entry name or list-entry identifier in the data block for the delete-list-entries command.

Entry-Locator Type (ELT): 429

A value that indicates how a list entry is located for a read, replace, or delete operation, or as the source of a move operation, and whether list-number comparison is requested. The list entry is located by list-entry identifier, list-entry name, unkeyed position or keyed position.

For a create or the target of a move operation, the target list-entry position is located by keyed position when the entries are keyed, or by unkeyed position when the entries are not keyed.

Key-Request Type (KRT): 439

A value that indicates how a keyed list entry is located when an entry is replaced, moved, read or deleted. The type determines the relationship between the list-entry-key object and the list-entry-key operand.

00 Equals list-entry-key operand

01 Less than or equal to the list-entry-key operand

10 Greater than or equal to the list-entry-key operand

11 Invalid

The key-request type is ignored when the entry-locator type is ignored or when the entries are not located by list-entry key.

List-Control Type (LCT): 468

The list-control type specifies either (1) the list-element-count or list-entry-count limit is written, depending on the counter indicator or (2) the user list control, both or neither are written.

List-Entry Type (LET): 435

A value that indicates whether data list entries, adjunct list entries, or both are read or replaced upon normal completion of the command execution.

Local-Lock Managers (LLM): 416

A value which identifies users with local interest in the lock-table entry.

Local-Lock Bit (LLB): 413
A value that is written to a local-lock manager.
Lock-Request Type (LRT): 412
A value that indicates the type of lock request. The lock request type specifies
(1) that No lock process is requested,
(2) to compare the global-lock managers,
(3) to replace the global-lock manager,
(4) to replace a local-lock manager,
(5) to replace the global-lock and local-lock managers.
Lock-Table-Entry Number (LTEN): 414 <431>
A value that specifies an entry in a lock table.
Move-Entry-Locator Type (MELT): 479
A value that indicates which key is used when a keyed list entry is moved.
The move-entry-locator type specifies whether
The target key is the LEK in the list entry or the TLEK in the MCB.
Read-List-Entries Count (RLEC): <4A2>
A value that specifies the number of list entries read.
Read-List Type (RLT): 4AB
A value that indicates whether list-entry controls, data, list entries, adjunct list entries, or any combination are read upon normal completion of the command execution.
Response Code (RC): 407
The response code indicates the result of executing a list command.
Restart Token (RT): 4A4 <4A5>
A value that controls the reading or deleting of list entries on the read-list-set and delete-list-set commands.
Retry Index (RX): 4AC
A VALUE that designates either a particular retry buffer or none.
Retry Version Number (RVN): 4AD <4A0>
A value that specifies the version number stored in the retry buffer.
Starting Data Index (SDI): 4A8
A value that indexes to the first list-entry name or list-entry identifier in the data block for the delete-list-entries command.
Target Direction (TDIR): 478
A value that indicates how the positions of the list entries are numbered relative to a designated target position for a moved list entry. The target direction is either left to right or right to left.
Target List-Entry Key (TLEK): 452
A value that partially specifies the targeted position to which a list entry is moved.
Target List Number (TLN): 453
A value that designates the list to which a list-entry is moved.
User Identifier (UID): 418 <419>
A value that identifies a user.
When the lock-request type specifies global-lock-manager and local-lock-managers replacement, the user identifier specifies a global-lock manager. When the lock-request type specifies global-lock-manager replacement, the user identifier specifies a global-lock manager and, when local-lock managers exist, it also specifies a local-lock manager. When the lock-request type specifies local-lock-manager replacement, The user identifier specifies a local-lock manager.
Version-Request Type (VRT): 422
A value that indicates the type of version-number request to (1) compare the version numbers or (2) to increment, decrement, or replace the version number, or both, or neither.

Write-Request Type (WRT): 420
A value that indicates the type of write request. The writer-request type specifies
(1) to replace a list entry,
(2) to Create a list entry, or
(3) to replace or create a list entry.
LIST STRUCTURE PROCESSES
The following processes may be invoked by the SES list-structure commands. The set of processes invoked by a command are listed in the command description.
Allocating a List Structure
The user structure control is updated on the allocate-list-structure command. A list structure is created on the first successful invocation of the allocate-list-structure command for a structure that does not already exist. A list structure is initially allocated after one or more successful invocations of the allocate-list-structure command. These operations are referred to generically as list-allocation processes.
Creating a List Structure
When a list structure is created, the list-structure type determines the attributes of the created structure. The list-structure type has indicators for each of the following: counters, locks, data, adjunct, name, and key.
When the counter indicator in the list-structure type specifies that the list-entry count and list-entry-count limit are defined and allocation is successful, the list controls for each list contain a list-entry count and a list-entry-count limit. When the counter indicator in the list-structure type specifies that the list-element count and list-element-count limit are defined and allocation is successful, the list controls for each list contain a list-element count and a list-element-count limit.
When the lock indicator in the list-structure type specifies that a lock table is created and allocation is successful, a lock table is created with a width as specified by the lock-table-entry characteristic and a length as specified by the lock-table-entry count.
When the data indicator in the list-structure type specifies that list entries have data and allocation is successful, storage is allocated for the creation of list elements. The size of the list elements is specified by the list-element characteristic.
When the adjunct indicator in the list-structure type specifies that list entries have adjunct and allocation is successful, each list entry created in the structure has an adjunct list entry.
When the name indicator in the list-structure type specifies that the list entries have names and allocation is successful, each list entry created in the structure has a list-entry name associated with it.
When the key indicator in the list-structure type specifies that the list entries have keys and allocation is successful, each list entry created in the structure has a list-entry key associated with it.
When a list structure is created, (1) the free-space and free-control-space global controls are updated, (2) the appropriate field in the structure-identifier vector is set, and (3) the list-structure and list controls are initialized.
Deallocating a List Structure
When a list structure is deallocated, the storage is freed, the free-space and free-control-space global controls are updated, the appropriate field in the structure-identifier vector, and all the list-monitoring-active objects are reset.
Attaching a List-Structure User
A list-structure user is attached by means of the attach-list-structure-user command.
When a list-structure user is attached, the user controls are initialized, the appropriate field in the user-identifier vector is updated, and the user is placed in the attached state.

Detaching a List-Structure User

A list-structure user is detached after one or more successful invocations of the detach-list-structure-user command.

When a list-structure user is detached, the list-monitoring-active object has been updated in all the list-monitor-table entries associated with the user. The user controls are deleted and the assigned field in the user-identifier vector is updated.

The list-monitoring-active bit is updated only after all list-notification commands issued to the associated list and user are complete.

Comparing Global-Lock Managers

Global-lock-manager comparison always occurs before a lock-table entry is written or may occur before a list entry is created, replaced, read, moved or deleted, depending on the command and lock-request type.

The global-lock-manager object is compared with the comparative-global-lock manager specified. When they match, the global-lock-manager comparison succeeds, and the command continues. When they do not match, the global-lock-manager comparison fails, and an indicative response code is returned.

Comparing Local-Lock Managers

Local-lock-manager comparison may occur before a lock-table entry is written or before a list entry is created, replaced, read, moved or deleted, depending on the command code and lock-request type.

There are two lock-request types that cause local-lock-manager comparison: global-lock-manager replacement, and local-lock-manager replacement.

When a local-lock-manager object exists and a global-lock-manager replacement is requested, the local-lock-manager-object value is ANDed with a mask of all ones except for the local-lock bit corresponding to the user identifier specified. This ANDed value is then compared with zero. When they match, the local-lock-manager comparison succeeds. When they do not match, the local-lock-manager comparison fails.

When a local-lock-manager object exists and a local-lock-manager replacement is requested, the local-lock bit corresponding to the user identifier specified is compared with the local-lock-bit value specified. When they match, the local-lock-manager comparison fails. When they do not match, the local-lock-manager comparison succeeds.

When the local-lock-manager comparison fails, an indicative response code is returned.

Writing a Lock-Table Entry

One or both of the objects contained within a lock-table entry may be replaced, depending on the lock-request type specified.

A global-lock manager may be replaced when a lock-request type specifies to replace the global-lock-manager or to replace the global-lock and local-lock managers and the global-lock-manager comparison succeeds.

One or more local-lock managers are replaced when a lock-request type specifies to replace a local-lock-manager or to replace the global-lock and local-lock managers and the global-lock-manager comparison succeeds.

Replacing a Global-Lock Manager

The global-lock-managers are compared and the local-lock-managers may be compared when global-lock-manager replacement is requested.

When the global-lock-manager comparison succeeds, the global-lock manager may be replaced with the user identifier specified, regardless of whether or not the local-lock-manager comparison succeeds.

Replacing a Local-Lock Manager

The global-lock-managers and local-lock-managers are compared when local-lock-manager replacement is requested.

When the global-lock-manager comparison succeeds, the local-lock bit corresponding to the user identifier specified may be replaced with the local-lock-bit value specified, regardless of whether or not the local-lock-manager comparison succeeds.

Replacing the Global-Lock and Local-Lock Managers

The global-lock-managers are compared when global-lock and local-lock-managers replacement is requested.

When the global-lock-manager comparison succeeds, the global-lock manager may be replaced with the user identifier specified and the local-lock managers are replaced with the local-lock managers specified.

Locating a List Entry or List-Entry Position

The designated list entry is the first entry relative to the designated position before an entry is deleted, when an entry is read, replaced or moved, or after an entry is created. The designated position is specified (1) by an unkeyed position, (2) by a keyed position, (3) by a list-entry identifier, or (4) by a list-entry name, depending on the entry-locator type specified and the type of structure allocated.

A list entry is located by unkeyed position when an entry-locator type specifies locate by unkeyed position or an unkeyed list entry is created or moved; that is, the designated position is specified by means of a list number and a direction. A list entry is located by keyed position when the list entries are keyed and an entry-locator type specifies locate by keyed position or a keyed list entry is created or moved; that is, the designated position is specified by means of a list number, direction, and a list-entry key. A list entry is located by list-entry identifier when an entry-locator type specifies locate by list-entry identifier; that is, the designated position is the position of the identified list entry. A list entry is located by list-entry name when the list entries are named and an entry-locator type specifies locate by list-entry name; that is, the designated position is the position of the named list entry.

A list entry has a position relative to the designated position. When a list entry is created, moved, or deleted, the relative positions of the successive list entries are changed. In these cases, the first entry is the designated list entry and successive entries are determined by the direction specified.

Regardless of how a list entry is located, when a left-to-right direction is specified, the last entry is the rightmost entry in the list, and when a right-to-left direction is specified, the last entry is the leftmost entry in the list.

When a list entry is located by list-entry identifier, the designated list entry is the identified list entry.

When a list entry is located by list-entry name, the designated list entry is the named list entry.

When a list entry is located by unkeyed position and a left-to-right direction is specified, the designated list entry is the leftmost entry in the list. When a list entry is located by unkeyed position and a right-to-left direction is specified, the designated list entry is the rightmost entry in the list.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a left-to-right direction is specified, then the designated source list entry is the leftmost entry with a key equal, with the largest key less than or equal, or with the smallest key greater than or equal to the specified list-entry-key request operand.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a right-to-left direction is specified, then the designated list entry is the rightmost entry with a key equal, with the largest key less than or equal, or with the smallest key greater than or equal to the specified list-entry-key request operand.

When (1) a list entry is located by keyed position, (2) entry creation or movement is requested, (3) a list entry with an equal key exists on the list, (4) a left-to-right direction is specified, then the designated target position is the position of the leftmost entry with the same key.

When (1) a list entry is located by keyed position, (2) entry creation or movement is requested, (3) a list entry with an equal key exists on the list, (4) a right-to-left direction is specified, then the designated target position is the position of the rightmost entry with the same key.

When (1) a list entry is located by keyed position, (2) entry creation or movement is requested, and (3) all entries on the list have a key greater than the specified key, the designated target position is the leftmost position in the list.

When (1) a list entry is located by keyed position, (2) entry creation or movement is requested, (3) at least one list entry on the list has a key less than the specified key, and (4) there is no list entry in the list that matches the specified key, then the designated target position is the first position after the rightmost entry with a key less than the specified list-entry key in the list.

When a list entry is located by list-entry identifier or by list-entry name, the designated position exists when the list entry exists.

When a list entry is located by unkeyed position, the designated position exists when the list exists.

When a list entry is located by keyed position and entry creation or movement is requested, the designated target position exists when the list exists.

When a list entry is located by keyed position and entry creation is not requested, the designated position exists when a list entry in the list has a key that is equal, greater than or equal, or less than or equal to the specified list-entry key in the list, depending on the key-request type.

When the designated position does not exist, an indicative response code is returned.

Comparing List Numbers

When the of the entry-locator type specifies list-number comparison and a list entry is not created, a list-number comparison is requested.

When list-number comparison is requested, the list-number object is compared with the list number specified. If they do not match, the list-number comparison fails, and an indicative response code is returned.

Comparing Counts

There are three sets of counts that are compared, depending on the process requested: the list-set-entry counts, the list-set-element counts, and the list entry counts or list-element counts, depending on the count indicator.

Comparing List-Element Counts

The list-element-count-limit object is compared with the list-element-count operand whenever a list entry is written or moved and the count indicator in the list-structure type is one. If the sum of the list-element count and the number of additional list elements required exceeds the list-element-count limit, the list is full. When the list is full and a write or move operation is requested, an indicative response code is returned.

The list-element-count limit or list-entry-count limit is updated on a write-list-controls command, depending on the list-control type.

Comparing List-Entry Counts

The list-entry-count-limit object is compared with the list-entry-count operand whenever a list entry is created or moved and they exist. A list is full when the number of list entries created matches or exceeds the list-entry-count limit. When the list is full and a create or move operation is requested, an indicative response code is returned.

Comparing List-Set-Element Counts

The maximum list-set-element-count object is compared with the list-set-element-count object whenever a data list entry is written. If the sum of the list-set-element count and the number of additional list elements required exceeds the maximum-list-set-element count, the list set is full. When the list set is full, and list-entry creation or retry-data block creation is requested, an indicative response code is returned.

Comparing List-Set-Entry Counts

The maximum list-set-entry-count object is compared with the list-set-entry-count object whenever a list entry is created. A list set is full when the number of list entries created and not deleted matches the maximum list-set-entry count. When a list set is full and list-entry creation or retry-data block creation is requested, an indicative response code is returned.

Updating Counts

There are three types of counts that are updated, depending on the process requested: the list-set-entry count, the list-set-element count, and the list-entry count or list-element count, depending on the count indicator.

Updating the List-Element Counts

The list-element counts are updated whenever a list entry is created, deleted, or moved to another list or replaced and the number of list elements associated with the list entry is changed or a retry-data block is created or deleted. When the list entry is also the retry-data block, the count is at most incremented or decremented by the number of list elements associated with the list entry.

Updating the List-Entry Counts

The list-entry counts are updated whenever they exist and a list entry is created, deleted, or moved to another list.

Updating the List-Set-Element Count

The list-set-element count is updated whenever a list entry is created, deleted, or replaced and the number of list elements associated with the list entry is changed or a retry-data block is created or deleted. When the list entry is also the retry-data block, the count is at most incremented or decremented by the number of list elements associated with the list entry.

Updating the List-Set-Entry Count

The list-set-entry count is updated whenever a list entry is created or deleted.

Comparing Version Numbers

Version numbers may be compared when an entry is replaced, read, moved, or deleted, depending on the version-request type specified. When a version-request type specifies to compare the version numbers, the version-number object is compared with the comparative-version-number request operand. When they match, processing continues. When they do not match, the version-number comparison fails, and an indicative response code is returned.

Updating a Version Number

A version number may be updated when an entry is created, replaced, read, or moved, depending on the version-request type specified.

When a version-request type of specifies to decrement the version number, the version number is decremented by one. When a version-request type specifies to increment the version number, the version number is incremented by one. When a version-request specifies to replace the version number, the version-number object is set to the version-number request operand.

Writing a List Entry

A list entry may be written on a write-list-entry or a write-and-move-list-entry command. A list entry is written when an entry is created or replaced.

When a list entry is created, the data and adjunct indicators within the list-structure-type object are used to determine whether or not to write the data or adjunct list entry, or both. When a list entry is replaced, the data and adjunct indicators within the list-entry-type operand are used to determine whether or not to write the data or adjunct list entry, or both.

When the data indicator specifies that the list entries have data, the data list entry is written from the data block. When the adjunct indicator specifies that the list entries have adjunct, the adjunct list entry is written from the adjunct-list-entry-value request operand.

When the data list entry is replaced and the data-list-entry-size operand is smaller than the data-list-entry-size object, the data-list entry is contracted to the new size, the data block is stored in the data-list entry, and the data-list-entry-size object in the list-entry controls is updated with the value of the data-list-entry-size operand. When the data list entry is replaced and the data-list-entry-size operand is larger than the data-list-entry-size object, the data-list entry is expanded to the new size, the data block is stored in the data-list entry, and the data-list-entry-size object in the list-entry controls is updated with the value of the data-list-entry-size operand.

Creating a List Entry

List-entry creation is requested on a write-list-entry command, depending on the write-request type specified.

When a write-request type specifies to create a list entry, list-entry creation is unconditionally requested. When a write-request type specifies to replace or create a list entry, list-entry creation is conditionally requested; that is, the list-entry creation is requested when the designated list entry does not exist.

When the list set and list is not full and list-entry creation is requested, a list entry may be created. When a list entry is created, the list-set-entry count and when it exists, the associated list-entry count are each incremented by one. When a list entry is created, the list-set-element count and when it exists, and the associated list-element count are each increased by the value of the data-list-entry size.

A list entry is created at the first entry position relative to the designated position, and the relative position of all succeeding entries is increased by one.

Replacing a List Entry

A list entry may be replaced on a write-list-entry command.

When a write-request type specifies to replace a list entry or to replace or create a list entry and the designated list entry exists, the list entry may be replaced.

When a list entry is replaced, the list-set-element count and when it exists, the associated list-element count are each increased or decreased by the change in the data-list-entry size.

The position of an entry is not affected when it is replaced.

When a write-request type specifies to replace a list entry and the designated list entry does not exist, an indicative response code is returned.

Reading a List Entry

A list entry may be read on a read-list-entry, move-and-read-list-entry, or read-and-delete-list-entry command, and one or more list entries may be read on a read-list or read-list-set command.

When the list-entry type specifies data list entries, one or more data list entries may be read into the data area, depending on the command executed. When the list-entry type specifies adjunct list entries, one adjunct list entry may be read into the adjunct-list-entry-value response operand, or one or more adjunct list entries are read into the data area, depending on the command executed.

When a read-list or read-list-set command is executed, the adjunct or data list entries are always read into the data area. Otherwise, when any other command that does a read operation is executed, the adjunct list entry is read into the response operand.

The position of an entry is not affected by a read operation.

Moving a List Entry

A list entry may be moved on a move-list-entry, a write-and-move-list-entry, or a move-and-read-list-entry command. List entries may be moved between lists or to the same list within a list set.

A list entry is moved from the first entry position relative to the designated position, and the relative position of all succeeding entries is decreased by one. A list entry is moved to the first entry position relative to the targeted position, and the relative position of all succeeding entries is increased by one.

When a list entry is moved from one list to another and list-entry counts exist, the list-entry count of the source list is decremented by one and the list-entry count of the target list is incremented by one.

When a list entry is moved from one list to another and list-element counts exist, the list-element count of the source list is decreased by the value of the data-list-entry size and the list-element count of the target list is increased by the same amount.

Deleting a List Entry

A list entry may be deleted on a delete-list-entry or a read-and-delete-list-entry command and one or more list entries may be deleted on a delete-list-set or delete-list-entries command.

An entry is deleted at the first entry position relative to the designated position, and the relative position of all succeeding entries is decreased by one.

When a list entry is deleted, the list-set-entry count and when list-entry counts exist, the associated list-entry count are each decremented by one.

When a list entry is deleted, the list-set-element count and when list-element counts exist, and the associated list-element count are each decreased by the value of the data-list-entry size.

Writing the Retry Buffer

When the retry index specifies a retry buffer, the retry-version-number request operand and all the response operands except for the response descriptor are stored in the retry-information portion of the retry buffer specified by the retry index. When the retry index specifies a retry buffer and a data list entry is read, the data list entry is also stored in the retry-data-block portion of the retry buffer specified by the retry index.

Notifying a List Monitor

Processing of a list-notification command consists of three operations; message-path selection, initiation, and completion.

When a list-state transition occurs, one or more list-notification commands are initiated for each user who is monitoring the list to the system which attached the user. All the list-notification commands initiated as a result of a list-state transition are initiated before the command that caused the list-state transition is completed.

The list-notification command provides the information necessary for the system to update one list-notification entry and, when requested, the associated list-notification summaries, to reflect the new list state.

A user becomes a list monitor by registering with the list by means of the register-list-monitor command. A user ceases to be a list monitor by deregistering from the list by means of the deregister-list-monitor command or by detaching from the list structure by means of the detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

This section defines the list-structure operands for the list notification command.

| List-Notification Operands | Acronym |
| --- | --- |
| Non-empty state change | NESC |
| List-notification-entry number | LNEN |
| List-notification token | LNT |
| Summary update | SU |

Non-empty State Change (NESC): 443

A value that indicates that the list transition from the associated list notification bit vector entry was either an empty to not-empty transition (value is one) or a not-empty to empty transition (value is zero).

List-Notification-Entry Number (LNEN): 442

An object or field that specifies a list-notification-vector entry.

List-Notification Token (LNT): 441

A value that specifies a list-notification vector to the system.

Summary Update (SU): termed LNRT 445

A value that indicates whether the list-notification-vector summaries are to be updated when an empty to not-empty state transition occurs on a monitored list.

List structure commands

This section summarizes the list structure commands that are supported by the SES facility 110. List structure commands are direct commands which are communicated from the CPC 101–104 to the message processing function 113 of the SES via the Send Message CPU instruction. List structure commands are categorized as follows:

Structure commands which allocate, read, and write list structures 111, list structure controls 201, and list controls 314.

User commands which allow a user (program) to identify itself to the SES, and to register as a monitor of specific lists 109 in the SES.

Lock only commands which support read, write, and clear operations on lock table objects 206.

Single-list-entry commands which support read, write, move and delete operations on one list entry object 302.

Multiple-list-entry commands, which support read and delete operations on multiple list objects/entries 302.

Structure commands

The structure commands are:
Allocate-list-structure (ALST),
Deallocate-list-structure (DLST),
Read-list-structure-controls (RLSC),
Read-list-controls (RLC), and
Write-list-controls (WLC).

ALST Command

The ALST command creates (allocates) a list structure 111.

The allocate-list-structure command creates a list structure when the structure identifier is not assigned and there is sufficient free space and sufficient free control space available in the SES for creating the requested lock-table entries, lists and associated controls, and at least one list entry when a list set is requested.

The allocate-list-structure command continues the initial allocation of a list structure when the structure identifier is assigned and initial allocation of the structure has not completed.

When the structure is allocated, a checkpoint is established and the maximum list-set-entry count, maximum list-set-element count, allocated structure size and an indicative response code are returned in the response operands.

When a model-dependent time period has elapsed before the allocation process is completed, the maximum list-set-entry count, maximum list-set-element count, allocated structure size and an indicative response code is returned in the response operands.

When insufficient free control space but sufficient free space is available in SES for the structure, an indicative response code is returned in the response operand.

When insufficient free space is available in SES for the structure, an indicative response code is returned in the response operand.

When the initial allocation of the list structure has not completed, the initial allocation is continued.

DLST Command

The DLST command deallocates the list structure 111 associated with the specified structure identifier. The designated list structure is deallocated and an indicative response code is returned in the response operand. When a model-dependent time period has elapsed before the deallocation process is completed, an indicative response code is returned in the response operand.

RLSC Command

The RLSC command returns (in the response operands) the list-structure controls 201 associated with the specified structure identifier.

RLC Command

The RLC command returns (in the response operands) the list controls 314 associated with the specified structure identifier and list number.

WLC Command

The WLC command writes/updates the list controls 314 associated with the specified structure identifier and list number.

The write-list-controls command writes the list controls, depending on the list-control type.

User commands

The user commands are:
Attach-list-structure-user (ALSU),
Detach-list-structure-user (DLSU),
Register-list-monitor (RLM), Deregister-list-monitor (DLM), and Read-user-controls (RUC).

ALSU Command

The ALSU command executes the attachment process.

Figure 12:
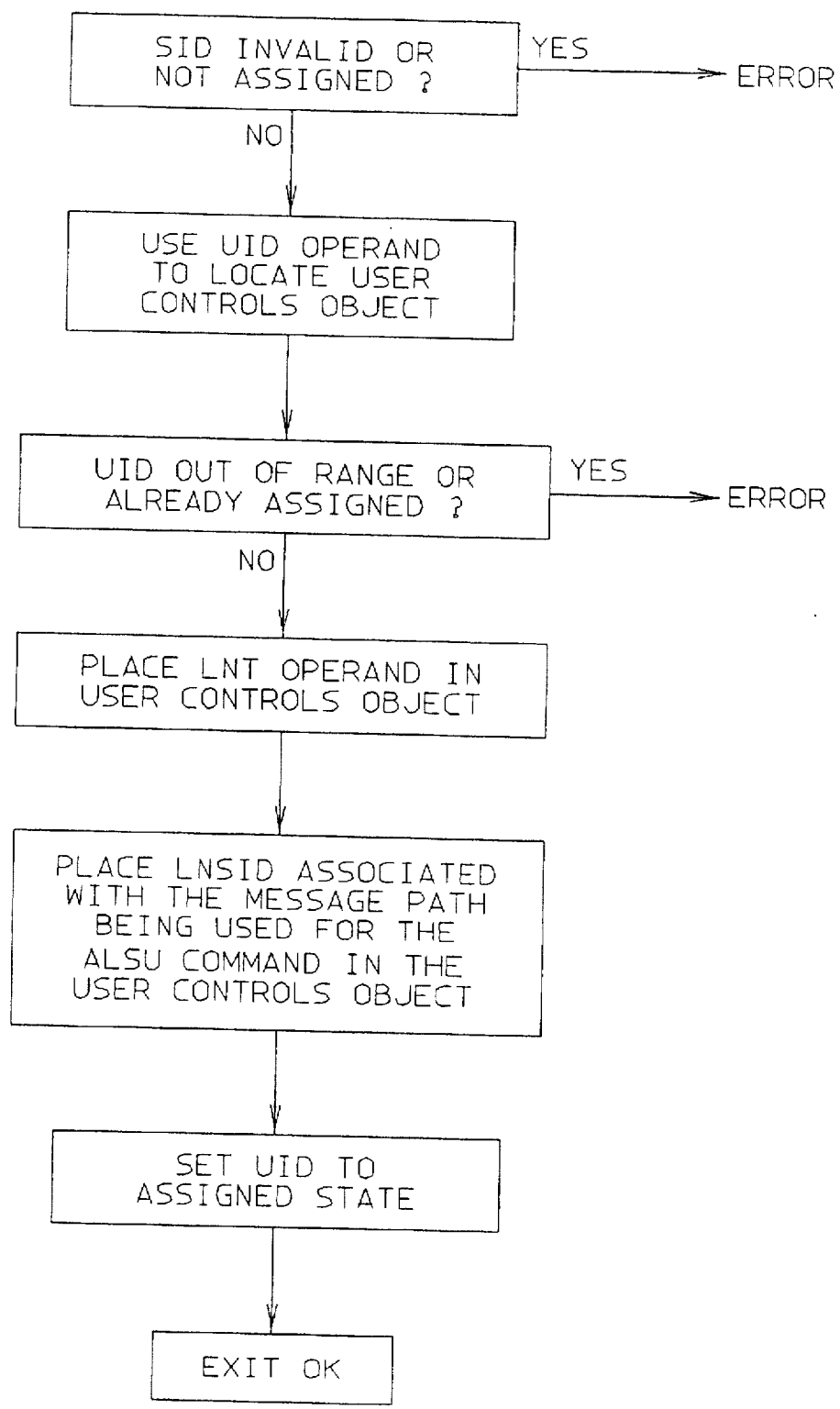
FIG. 12 is a flowchart illustrating the Attach List Structure User (ALSU) command.

FIG. 12 is a flowchart showing the process for the ALSU command.

The attach-list-structure-user command attaches the list-structure user.

When the list-structure user is attached, an indicative response code is returned in the response operand.

DLSU Command

The DLSU command completes the detachment process and changes the state of the user identifier 418 to unassigned.

Figure 13:
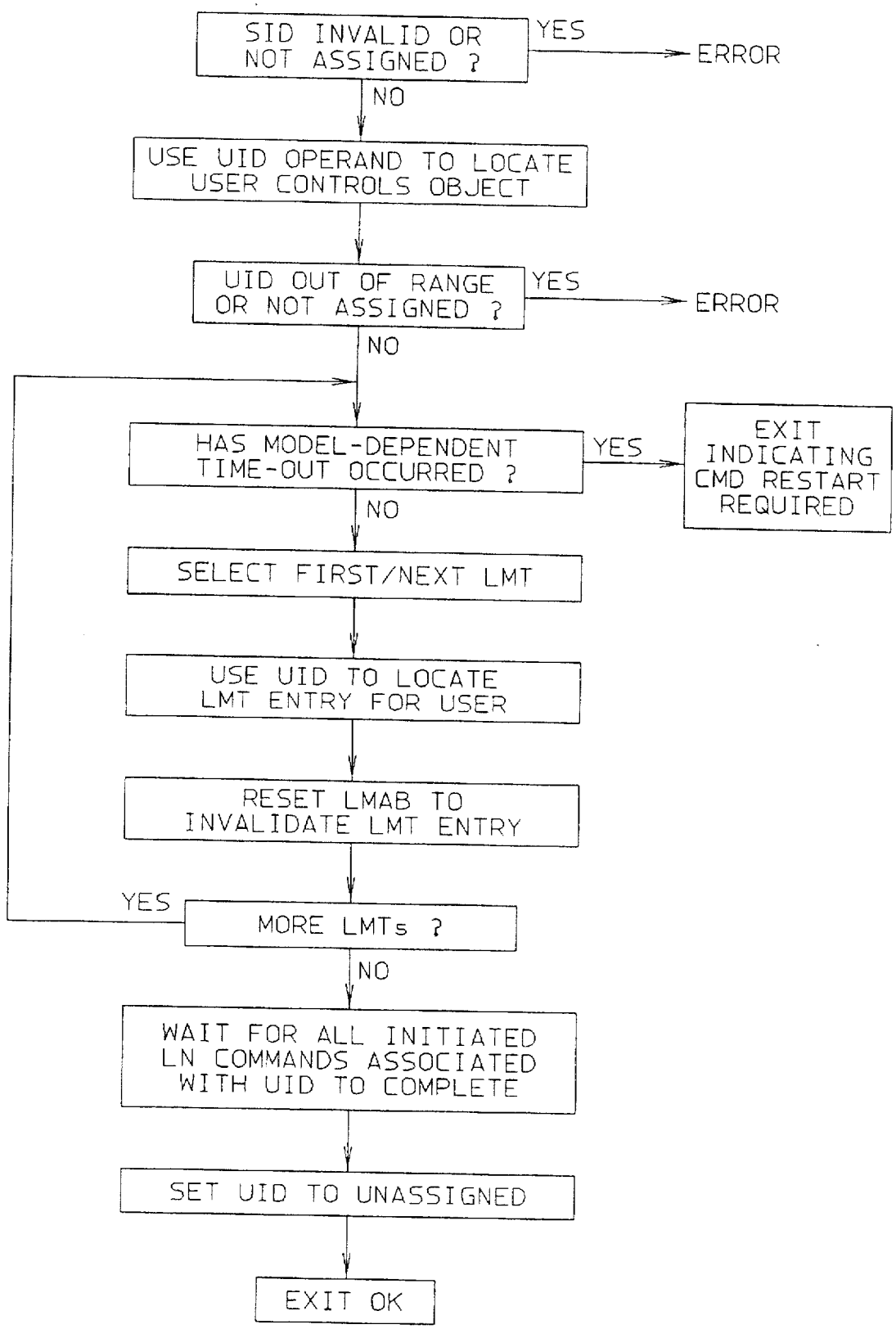
FIG. 13 is a flowchart illustrating the Detach List Structure User (DLSU) command.
Figure 14:
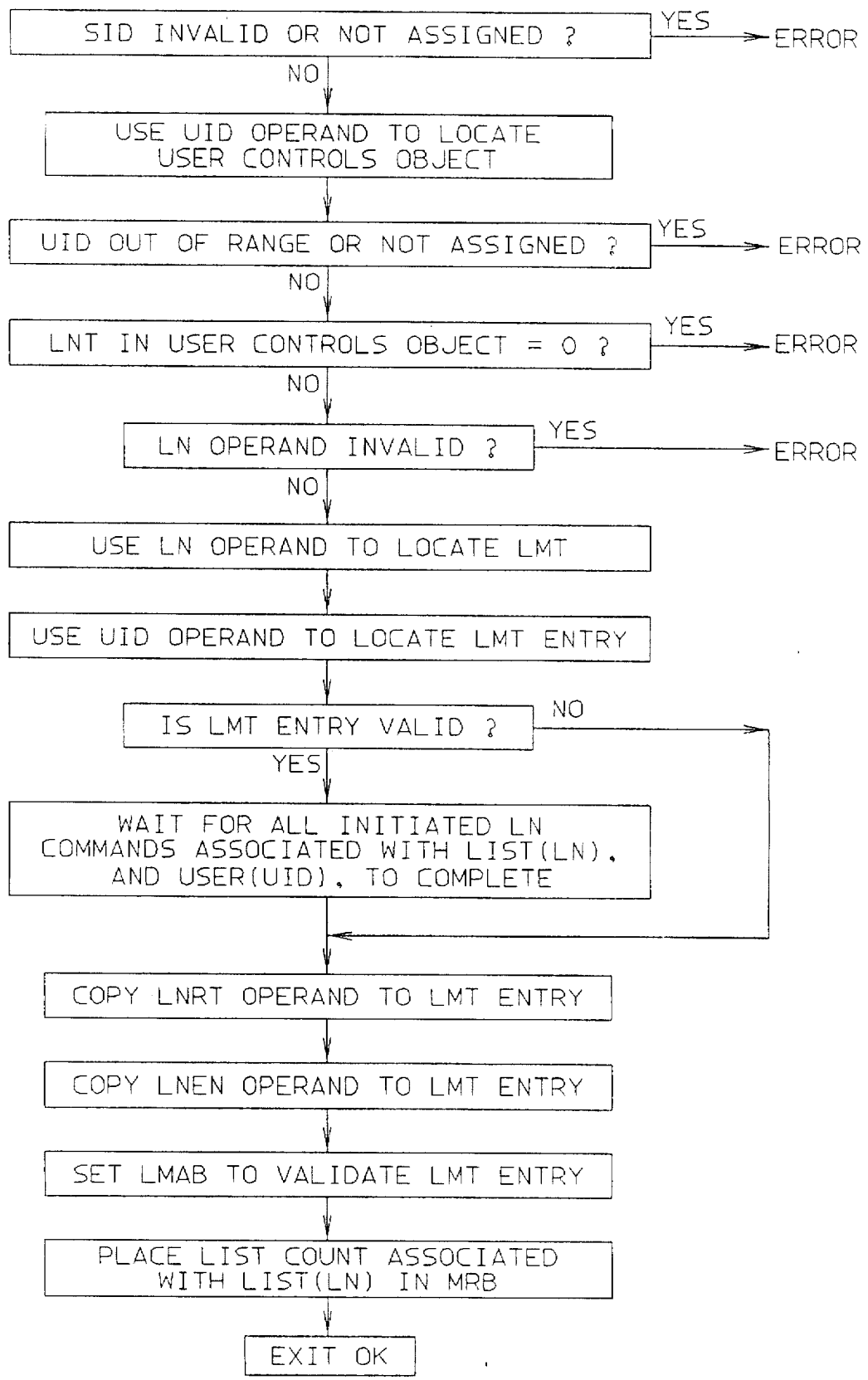
FIG. 14 is a flowchart illustrating the Register List Monitor (RLM) command.

FIG. 13 is a flowchart showing the process for the DLSU command.

The detach-list-structure-user command continues detaching the list-structure user.

The detach-list-structure-user command completes detaching the list-structure user when the list-monitoring-active bit of all the list-monitor-table entries associated with the list-structure user is reset. After processing all list monitor tables, the DLSU command waits for all initiated LN commands associated with the list structure user to complete 1501.

The user identifier is placed in the unassigned state.

When the list-structure user is detached, an indicative response code is returned in the response operand.

When the model-dependent time period has elapsed before the detachment process is complete, an indicative response code is returned in the response operand.

RLM Command

The RLM command registers a list structure user as a list monitor by updating the list monitor table 316. It is described in FIG. 16.

When the specified list-structure user is attached with a valid list-notification token, the list-monitoring-active field is updated and the list-notification-request type and list-notification entry number are updated in the list-monitor-table entry of the specified list and user, and the list-entry count or the list-element count and an indicative response code are returned in the response operands.

When the specified list-structure user is attached with an invalid list-notification token, an indicative response code is returned in the response operand.

DLM Command

Figure 15:
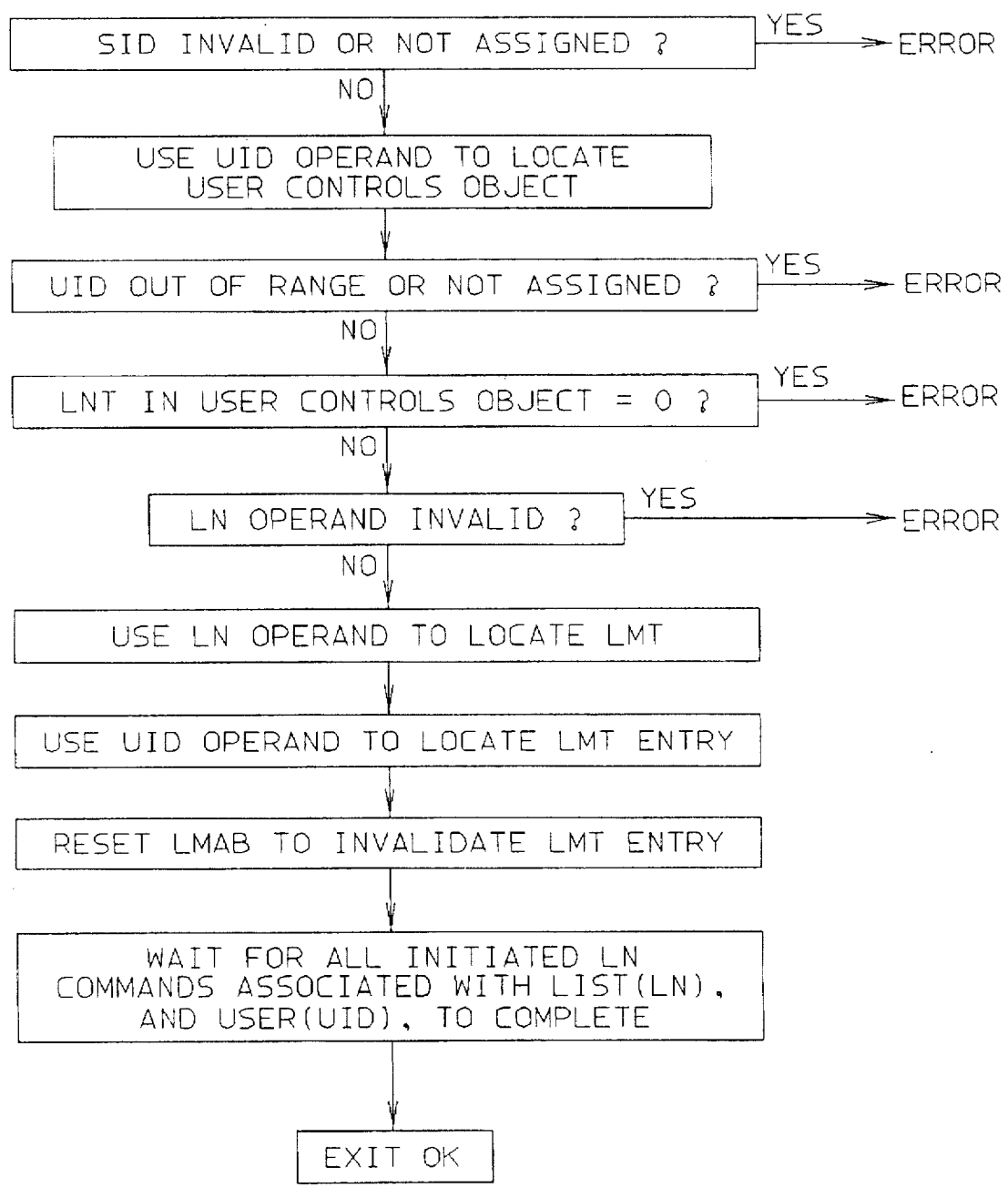
FIG. 15 is a flowchart illustrating the Deregister List Monitor (DLM) command.

The DLM command deregisters a list structure user as a list monitor. It is described in FIG. 15.

The list-monitoring-active field is updated in the list-monitor-table entry of the specified list and user. Then the DLM command waits for all initiated LN commands associated with the list and user to complete 1701. An indicative response code is returned in the response operand.

RUC Command

The RUC command returns the user controls 210 in the response operands.

Lock-only commands

The lock-only commands are:

Read-lock-table-entry (RLTE),

Write-lock-table-entry (WLTE),

Read-next-lock-table-entry (RNLTE), and

Clear-lock-table (CLT).

RLTE Command

The RLTE command returns the lock-table-entry value of the lock-table-entry 206 specified by the structure identifier and lock-table-entry number.

The lock-table-entry value of the lock-table entry specified by the structure identifier and lock-table-entry number and an indicative response code are returned in the response operands.

WLTE Command

The WLTE command compares the global-lock managers 207 and conditionally replaces the global-lock managers, the local-lock managers 208 or both.

When a global-lock manager is replaced and there are no other local-lock managers or when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then an indicative response code is returned in the response operand.

When global-lock manager comparison fails, an indicative response code is returned in the response operand.

RNLTE Command

The RNLTE command conditionally reads the next non-zero lock-table entry 206.

The read-next-lock-table-entry command scans the lock-table entry starting at the lock-table-entry number specified and proceeds sequentially in ascending lock-table-entry number order until a nonzero entry or the end of the lock table is reached, or a model-dependent time period elapses.

When the end of the lock table is reached without encountering a nonzero entry, the last lock-table-entry number and an indicative response code are returned in the response operands.

When a model-dependent time period has elapsed before the end of the lock table is reached, an indicative response code is returned in the response operand.

When a nonzero lock table entry is reached, the lock-table-entry number, the lock-table-entry value, and response code 2 are returned in the response operands.

CLT Command

The CLT command zeros one or more lock-table entries 206.

The clear-lock-table command zeros the lock-table entries starting at the lock-table-entry number specified and proceeds sequentially in ascending lock-table-entry-number order until a model-dependent time period elapses or the end of the lock table is reached.

When the end of the lock table is reached before a model-dependent time period has elapsed, an indicative response code is returned in the response operand.

When a model-dependent time period has elapsed before the end of the lock table is reached, the lock-table-entry-number of the next entry in the sequence that has not been cleared and an indicative response code is returned in the response operand.

Single-list-entry commands

The single-list-entry commands are:

Read-list-entry (RLE),

Write-list-entry (WLE),

Move-list-entry (MLE),

Delete-list-entry (DLE),

Write-and-move-list-entry (WMLE),

Move-and-read-list-entry (MRLE),

Read-and-delete-list-entry (RDLE),

RLE Command

The RLE command conditionally compares the list numbers 305 and 423, compares the version numbers 304 and 421, conditionally updates the version number 304 with 411, compares the global-lock managers 207 and 415, compares the local-lock managers 208 and 416, writes the lock-table entry 206, returns the designated list-entry controls 315 and list entry values 306 and 309, and conditionally updates the retry buffer.

The list entry is located and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be read, all of these processes, when requested, must succeed. In order for a lock-table entry to be written, all of these processes except for local-lock manager comparison, when requested, must succeed.

The retry buffer is written, depending on the retry index.

When a list entry is read, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock mangers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated-list-entry controls and an indicative response code are returned in the response operands.

When the designated list entry exists but the requested list-number comparison fails, the designated-list-entry controls and an indicative response code of are returned in the response operands.

When the designated list entry does not exist, an indicative response code is returned in the response operand.

WLE Command

The WLE command conditionally compares the list numbers 305 and 423, compares the list-set-entry counts, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, replaces or creates the designated list entry 302, returns the designated list-entry controls 315, and conditionally updates the retry buffer.

The designated list entry or position is located and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written, these processes, when requested, must succeed. In order for a lock-table entry to be written, all of these processes except for local-lock manager comparison, when requested, must succeed.

When a list entry is created and a list-state transition results, the list monitors are notified. The list-notification command does not have to complete before the write-list-entry command completes.

The retry buffer is written, depending on the retry index.

When a list entry is written, the list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code of are returned in the response operands.

When the designated list entry does not exist, an indicative response code is returned in the response operand.

When the list-entry name already exists and list-entry creation is requested, an indicative response code is returned in the response operand.

MLE Command

The MLE command conditionally compares the list numbers 305 and 423, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry controls 315, and conditionally updates the retry buffer.

The list entry and the designated target position are located, the list-entry counts or list-element counts are compared, and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-list-entry command completes.

The retry buffer is written, depending on the retry index.

When a list entry is moved, the designated-list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

DLE Command

The DLE command conditionally compares the list numbers 305 and 423, compares the version numbers 304 and 421, conditionally replaces the version number 304 with 411, compares the global-lock managers 207 and 415, compares the local-lock managers 208 and 416, writes the lock-table entry 206, deletes the designated list entry 302, returns the designated list-entry controls 315, and conditionally updates the retry buffer.

The list entry is located and, when requested, the list numbers are compared, the version numbers are compared, or the global-lock managers are compared, or any combination of the preceding processes is performed. When the global-lock managers are compared, the local-lock managers may be compared. In order for a list entry to be deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the delete-list-entry command completes.

The retry buffer is written, depending on the retry index.

When a list entry is deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When the global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

WMLE Command

The WMLE command conditionally compares the list numbers 305 and 423, compares the list-set-entry counts, compares the list-entry counts 301 and 303 or list-element-counts 312 and 313, creates or replaces a list entry 302, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry controls 315, and conditionally updates the retry buffer.

The designated list entry or position is located, and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written and moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the write-and-move-list-entry command completes.

The retry buffer is written, depending on the retry index.

When a list entry is written and moved, the list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

When the list-entry name already exists and list-entry creation is requested, an indicative response code is returned in the response operand.

MRLE Command

The MRLE command conditionally compares the list numbers 305 and 423, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry values 306 and 309, returns the designated list-entry controls 315, and conditionally updates the retry buffer.

The list entry and the designated target position are located, the list-entry counts or list-element counts are compared, and, when requested, the list numbers are compared, the version numbers are compared, the version numbers are updated, or the global-lock managers are compared, or any combination of the preceding processes is performed. When the global-lock managers are compared, the local-lock managers may be compared. In order for a list entry to be moved and read, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-and-read-list-entry command completes.

The retry buffer is written, depending on the retry index.

When a list entry is moved and read, the designated list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response code.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

RDLE Command

The RDLE command conditionally compares the list numbers 305 and 423, compares the version numbers 304 and 421, conditionally updates the version number 304 with 411, compares the global-lock managers 207 and 415, compares the local-lock managers 208 and 416, writes the lock-table entry 206, deletes the designated list entry 302, returns the designated list-entry values 306 and 309, returns the designated list-entry controls 315, and conditionally updates the retry buffer.

The list entry is located and, when requested, the list number is compared, the version numbers are compared, or the global-lock managers are compared, or any combination of the preceding processes is performed. When the global-lock managers are compared, the local-lock managers may be compared. In order for a list entry to be read and deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the read-and-delete-list-entry command completes.

The retry buffer is written, depending on the retry index.

When a list entry is read and deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operand.

When a global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

Multiple-list-entry commands

The multiple-list-entry commands are:

Read-list (RL),

Read-list-set (RLS),
Delete-list-set (DLS), and
Delete-list-entries (DLES).

RL Command

The RL command conditionally compares the list numbers 305 and 423, and the version numbers 304 and 421. It returns the read-list entries count, the list-entry controls 315 of the next list entry 302, zero or more list-entry values 306 and 309, zero or more list-entry controls 315, or any combination of the preceding.

Figure 16:
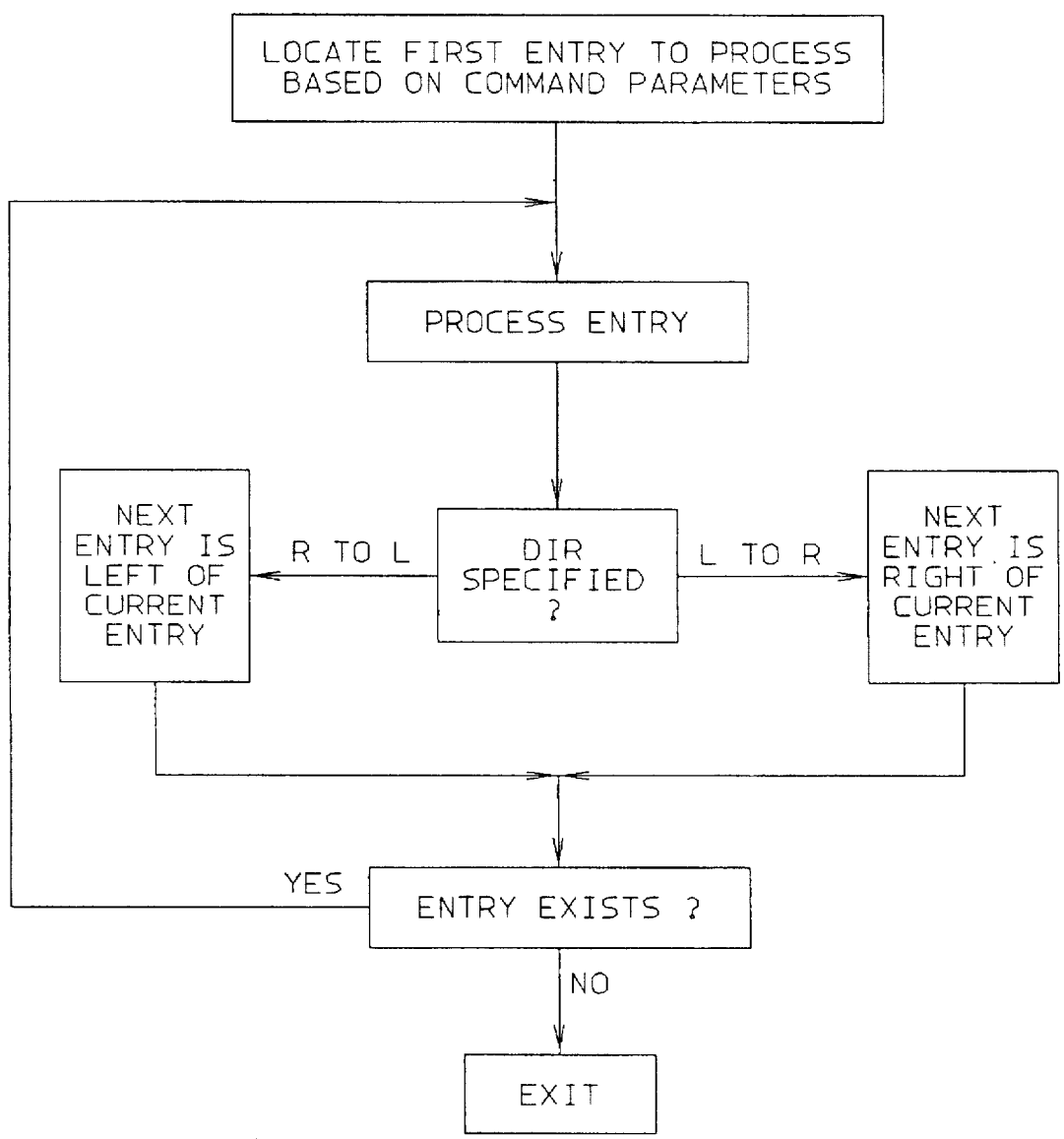
FIG. 16 is a flowchart illustrating the process of scanning for list entries by direction, for multiple list entry commands.

When requested, the list numbers are compared before the first list entry is scanned. (The scanning process is illustrated in FIG. 16.) The list entries are scanned starting at the designated position and proceeding in the direction specified until a model-dependent time period elapses, the data area is filled, or the last list entry is scanned. Each list entry is located and, when requested, the version numbers are compared. In order for any list entries or list-entry controls to be read, the list-number comparison, when requested, must succeed. In order for a particular list entry or list-entry controls to be read, the version-number comparison, when requested, must succeed.

The list-entry controls and adjunct list entry for the first list entry scanned are placed in the message-response block. The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the list-entry controls of the next list entry in the sequence to be scanned and an indicative response code are returned in the response operands.

When the specified data-block size is not large enough to contain the information specified by the read-list type for at least one list entry, an indicative response code is returned in the response operand.

When the designated list entry exists but the requested list-number comparison fails, the designated-list-entry controls and an indicative response code are returned in the response operands.

When the designated list entry does not exist, an indicative response code is returned in the response operand.

RLS Command

The RLS command conditionally compares the list numbers 305 and 423 and the version numbers 304 and 421. It returns the read-list entries count, the restart token, zero or more list-entry values 306 and 309, zero or more list-entry controls 315, or any combination of the preceding.

The list entries within the list set are scanned starting at the restart token specified until a model-dependent time period elapses, the data area is filled, or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry or list-entry controls to be read, the version-number comparison and list-number comparison, when requested, must succeed.

The list-entry controls and adjunct list entry for the first list entry scanned are placed in the Message Response Block (MRB). The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the restart token, and an indicative response code are returned in the response operands.

When the specified data block size is not large enough to contain the information specified by the read-list type for at least one list entry, an indicative response code is returned in the response operand.

When the restart token is invalid, an indicative response code is returned in the response operand.

DLS Command

The DLS command conditionally compares the list numbers 305 and 423 and the version numbers 304 and 421. It returns the delete-list entries count, and the restart token. It deletes zero or more list-entries 302.

The list entries within the list set are scanned starting at the restart token specified until a model-dependent time period elapses or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-set command completes.

When the last list entry is scanned, the delete-list-entries count equaling the number of list entries deleted and an indicative response code are returned in the response operands.

When a model-dependent time period has elapsed, the delete-list-entries count equaling the number of list entries deleted, the restart token, and response code 1 are returned in the response operands.

When the restart-token operand is invalid, an indicative response code is returned in the response operand.

DLES Command

The DLES command conditionally compares the list numbers 305 and 423 and the version numbers 304 and 421. It returns the delete-list entries count, and the current data index. It deletes zero or more list-entries 302.

The list entries within the list set are scanned starting at the first list entry specified by the starting data index and continuing in the same order as specified in the data block. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-entries command completes.

When the last list entry specified by the ending data index is scanned, the delete-list-entries count equaling the number of list entries deleted and an indicative response code are returned in the response operands.

When a model-dependent time period has elapsed, the delete-list-entries count equaling the number of list entries deleted, the current data index of the next list entry to be scanned, and an indicative response code are returned in the response operands.

When the designated list entry does not exist, the delete-list-entries count equaling the number of list entries deleted, the current data index of the nonexistent list entry, and an indicative response code are returned in the response operands.

The invention claimed is:

1. An apparatus for providing conditional operations on shared data objects shared among two or more applications operating in a system comprising one or more general purpose processors on which said applications execute, each of said one or more general purpose processors being coupled to a structured external storage (SES) facility that is distinct from said one or more general purpose processors, said apparatus comprising:

a) means for creating a data structure comprising said shared data objects within said SES facility;

b) communication means for communicating a function request message between one of said two or more applications and said SES facility, said function request message specifying an operation on a target data object selected from said shared data objects, said operation being contingent on a presumed state of said target data object; and c) a message processor within said SES facility, responsive to said function request message and operating on said data structure, said message processor comprising a predicate function means for executing a predicate function within said SES facility, independently of said one or more general purpose processors, for verifying said presumed state of said target data object and a data function means for executing a data function within said SES facility, independently of said one or more general purpose processors, for performing said operation on said target data object, said predicate function executing unconditionally and producing either a "successful" or an "unsuccessful" condition, said data function executing conditionally and atomically with respect to said predicate function, following a "successful" condition produced by said predicate function.

2. The apparatus of claim 1 in which said data structure comprises a list structure, said list structure comprising one or more lists, each of said one or more lists comprising a list control and one or more list entries, and in which said function request messages each comprise a list command message.

3. The apparatus of claim 2 in which said predicate function means comprises a predicate compare function means for executing a predicate compare function for comparing said presumed state of said target data object with its actual state and a predicate update means for executing a predicate update function for updating the state of said target data object, said predicate compare function executing unconditionally and producing either a "successful" or an "unsuccessful" condition, said predicate update function executing conditionally and atomically with respect to said predicate compare function, following a "successful" condition produced by said predicate compare function.

4. The apparatus of claim 3 in which each of said list entries comprises a version number field having a list entry version number value, in which said list command message comprises a comparative version number field having a comparative version number value, and in which said predicate compare function comprises a compare version number function, said compare version number function comparing said comparative version number value with the list entry version number value in a specified list entry.

5. The apparatus of claim 4 in which said predicate update function comprises a change version number function, said change version number function replacing said list entry version number value with a replacement value.

6. The apparatus of claim 5 in which said list command message further comprises an indicator field having an indicator value and an optional replacement field having an optional replacement value, and in which said replacement value is a predetermined positive delta to said list entry version number value when said indicator field has a first value, said replacement value is a predetermined negative delta to said list entry version number value when said indicator field has a second value, and said replacement value is said optional value when said indicator field has a third value.

7. The apparatus of claim 3 in which said list structure further comprises a lock table having one or more lock table entries each having lock table entry value, in which said list command message comprises a comparative lock entry having a comparative lock value, and in which said predicate compare function comprises a compare lock value function, said compare lock value function comparing said comparative lock value with a first one of said lock table entry values.

8. The apparatus of claim 7 in which said predicate update function comprises a change lock value function, said change lock value function replacing said first one of said lock table entry values with a replacement value.

9. The apparatus of claim 8 in which each of said lock table entries comprises a global lock table entry, in which each of said lock table entry values comprises a global lock table entry value, in which said comparative lock value comprises a comparative global lock value, and in which said first one of said lock table entry values comprises a global lock table entry value.

10. The apparatus of claim 7 in which said predicate update function comprises a change lock value function, said change lock value function replacing a second of said lock table entry values with a replacement value.

11. The apparatus of claim 10 in which each of said lock table entries comprises a global lock table entry and a local lock table entry, in which each of said lock table entry values comprises a global lock table entry value and a local lock table entry value, in which said comparative lock value comprises a comparative global lock value, in which said first of said lock table entry values comprises a global lock table entry value, and in which said second of said lock table entry values comprises a local lock table entry value.

12. The apparatus of claim 3 in which each of said list entries comprises a list number field having a list entry list number value, in which said list command message comprises comparative list number field having a comparative list number value, and in which said predicate function comprises a compare list number function, said compare list number function comparing said comparative list number value with said list entry list number value in a specified list entry.

13. The apparatus of claim 3 in which said communication means is a first communication means, said apparatus further comprising second communication means for communicating response messages between said SES facility and one of said two or more applications, said response messages each comprising a list entry controls field.

14. The apparatus of claim 13 in which said list entry controls field comprises a list entry number field and a list entry version number field.

15. The apparatus of claim 2 further comprising Write List Controls means for setting a list threshold control field in said SES facility to a list threshold value; in which said predicate function comprises a compare means for comparing, for a less than or equal condition, a projected list size with said list threshold value; and in which said data function, if executed, causes a target one of said one or more lists to have a size equal to said projected list size.

16. The apparatus of claim 2 in which predicate function means comprises:

> a first predicate compare function means for executing a first predicate compare function for comparing said presumed state of said target data object with its actual state, and a first predicate update means for executing a first predicate update function for updating the state of said target data object, said first predicate compare function executing unconditionally and producing either a "first successful" or "first unsuccessful" condition, said first predicate update function executing conditionally and atomically with respect to said first predicate compare function, following a "first successful" condition produced by said first predicate compare function;
>
> said predicate function means further comprising a second predicate compare function means for executing a second predicate compare function for comparing said presumed state of said target data object with its actual state, and a second predicate update means for executing a second predicate update function for updating the state of said target object, said second predicate compare function executing conditionally and atomically with respect to said first predicate update function following "first successful" condition produced by said first predicate compare function, said second predicate compare function producing either a "second successful" or a "second successful" condition, said second predicate update function executing conditionally and atomically with respect to said second predicate compare function, following a "second successful" condition produced by said second predicate compare function;
>
> said predicate function execution producing said "successful" condition only when said first predicate compare function produces said "first successful" condition and said second predicate compare function produces said "second successful" condition.

17. An apparatus for providing serialized access to shared data objects shared among two or more applications operating in a system comprising one or more general purpose processors on which said applications execute, each of said general purpose processors being coupled to a structured external storage (SES) facility that is distinct from said one or more general purpose processors, said apparatus comprising:

> a) a list data structure stored within said SES facility and comprising said shared data objects, said list data structure comprising one or more lists, each of said one or more lists comprising a list control and one or more list entries having list entry identification tokens;
>
> b) communication means for communicating a function request message between one of said two or more applications and said SES facility, said function request message specifying an operation on a particular list entry, said operation being contingent on the existence of said particular list entry within said list data structure, said function request message comprising a supplied means for designating said particular list entry; and
>
> c) a message processor within said SES facility, responsive to said function request message and operating on said list data structure, said message processor comprising a predicate function means for executing a predicate function independently of said one or more general purpose processors and a data function means for executing a data function independently of said one or more general purpose processors, said predicate function comprising a compare identifier function comparing said supplied means for designating said particular list entry with the list entry identification token within one of said one or more list entries, to generate an "equal" or "not equal" result, and said data function comprising a create/replace list data entry function operationally conditioned on the result of said compare identifier function, and executing atomically with said compare identifier function, so that a create function creating a new list entry is performed when said predicate function generates a "not equal" result, and a replace function replacing an existing list entry is performed when said predicate function generates an "equal" result.

18. A method for operating a computer system to provide serialized access to shared data objects shared among two or more applications operating om said system comprising one or more general purpose processors on which said applications execute, each of said one or more general purpose processors being coupled to a structured external storage (SES) facility that is distinct from said one or more general purpose processors, said method comprising the steps of:

> a) creating a data structure, comprising said shared data objects, within said SES facility;
>
> b) communicating a function request message between one of said two or more applications and said SES facility, said function request message specifying an operation on a target data object selected from said shared data objects, said operation being contingent on a presumed state of said target data object;
>
> c) performing within said SES facility, in response to said function request message and independently of said one or more general purpose processors, a serialization-checking predicate function for verifying said presumed state of said target data object, said predicate function resulting in a "successful" or an "unsuccessful" condition; and
>
> d) if said performing of said predicate function results in a "successful" condition, providing said serialized access and further performing within said SES facility, atomically with said predicate function and independently of said one or more general purpose processors, a data function comprising said operation on said target data object.

19. The method of claim 18 in which said step of creating a data structure further comprises the step of creating a list data structure, said list data structure comprising a list control and one or more lists, each of said one or more lists comprising one or more list entries, each of said one or more list entries comprising a version number field having a list entry version number value; in which said function request message comprises a list command specifying an operation on a specified list entry of one of said lists, said list command comprising a comparative version number field having a comparative version number value; and in which said step of performing a predicate function comprises comparing said comparative version number value with the list entry version number value in said specified list entry.

20. The method of claim 19 in which said step of performing said predicate function further comprises replacing said list entry version number value with a replacement value.

21. The method of claim 18 in which said step of creating a data structure comprises the step of creating a list data structure, said list data structure comprising a list structure and one or more lists, each of said one or more lists comprising one or more list entries, and said list data structure further comprising a lock table having one or more lock table entries each having a lock table entry value, each of said list entries being controlled by a corresponding lock table entry; in which said function request message comprises a list command specifying an operation on a specified list entry of one of said lists, said list command comprising a comparative lock entry having a comparative lock value; and in which said step of performing said predicate function comprises comparing said comparative lock value with the value in the lock table entry corresponding to said specified list entry.

22. The method of claim 18 in which said step of creating a data structure comprises the step of creating a list data structure, said list data structure comprising a list structure and one or more lists, each of said one or more lists comprising one or more list entries, each of said one or more list entries comprising a list number value; in which said function request message comprises a list command comprising a comparative list number field having a comparative list number value; and in which said predicate function comprises comparing said comparative list number value with the list number value in a specified list entry.

23. The method of claim 18 in which said step of creating a data structure further comprises the step of creating a list data structure, said list data structure comprising one or more lists, each of said one or more lists comprising a list control and one or more list entries; in which said method further comprises performing a write list controls function to set a list threshold control field in said SES facility to a list threshold value; in which said predicate function comprises comparing, for a less than or equal condition, a projected list size with said list threshold value; and in which said data function, if executed, causes a target one of said one or more lists to have a size equal to said projected list size.

24. A method for operating a computer system to provide serialized access to data shared among two or more applications operating in said system comprising one or more general purpose processors on which said applications execute, each of said one or more general purpose processors being coupled to a structured external storage (SES) facility that is distinct from said one or more general purpose processors, said method comprising the steps of:

a) creating a list data structure within said SES facility, said list data structure comprising a list control and one or more lists, each of said one or more lists comprising one or more list entries having SES list entry identification tokens;

b) communicating a function request message between one of said two or more applications and said SES facility, said function request message specifying an operation on a particular list entry, said operation being contingent on the existence of said particular list entry within said list data structure, said function request message comprising a supplied means for designating a particular list entry; and c) executing atomically within said SES facility, in response to said function request message and independently of said one or more general purpose processors, a function pair comprising a predicate function and a data function, said predicate function comprising the step of comparing said supplied means for designating a particular list entry with the list entry identification token within one of said one or more list entries to produce an "equal" or "not equal" condition, and said data function comprising a write list data entry function operationally conditioned on a result of said step of comparing so that a new list entry is written if said predicate function produces a "not equal" condition, and a replacement list entry is written if said predicate function produced an "equal" condition.

* * * * *

UNITED STATES PATENT AND TRADEMARK OFFICE
CERTIFICATE OF CORRECTION

PATENT NO. : 5,742,830
DATED : April 21, 1998
INVENTOR(S) : David A. Elko et al.

It is certified that error appears in the above-identified patent and that said Letters Patent is hereby corrected as shown below:

Column 43, line 39, "successful" should be --unsuccessful--; Column 44, line 30, "om" should be --in--

Signed and Sealed this

Eleventh Day of May, 1999

Attest:

Q. TODD DICKINSON

*Attesting Officer*　　　*Acting Commissioner of Patents and Trademarks*